US011320639B2

(12) United States Patent
Matsuzaki et al.

(10) Patent No.: US 11,320,639 B2
(45) Date of Patent: May 3, 2022

(54) MICROSCOPE OPTICAL MODULE, MICROSCOPE, CONTROL DEVICE FOR MICROSCOPE OPTICAL MODULE, AND MULTIPHOTON EXCITATION MICROSCOPE

(71) Applicant: JAPAN SCIENCE AND TECHNOLOGY AGENCY, Kawaguchi (JP)

(72) Inventors: Masanori Matsuzaki, Tokyo (JP); Shin-Ichiro Terada, Tokyo (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 397 days.

(21) Appl. No.: 15/920,824

(22) Filed: Mar. 14, 2018

(65) Prior Publication Data

US 2018/0203219 A1    Jul. 19, 2018

Related U.S. Application Data

(63) Continuation of application No. PCT/JP2016/072139, filed on Jul. 28, 2016.

(30) Foreign Application Priority Data

Sep. 17, 2015  (JP) .............................. JP2015-184497

(51) Int. Cl.
*G02B 21/00* (2006.01)
*G02B 21/02* (2006.01)
(Continued)

(52) U.S. Cl.
CPC ............. *G02B 21/02* (2013.01); *G02B 21/16* (2013.01); *G02B 21/18* (2013.01); *G02B 21/365* (2013.01); *G02B 21/367* (2013.01); *G02B 3/0087* (2013.01)

(58) Field of Classification Search
CPC .. G02B 21/00; G02B 21/0004; G02B 21/008; G02B 21/02; G02B 21/04; G02B 21/18;
(Continued)

(56) References Cited

U.S. PATENT DOCUMENTS 4,236,781 A * 12/1980 Arimura .............. G02B 21/082
                                                        348/131
4,714,327 A * 12/1987 Marshall ................ G02B 21/18
                                                        359/364

(Continued)

FOREIGN PATENT DOCUMENTS

CN        1707245 A      12/2005
CN        2828847 Y      10/2006
(Continued)

OTHER PUBLICATIONS

English translation of International Preliminary Report on Patentability Chapter II (PCT/IPEA/409) of corresponding international application PCT/JP2016/072139.
(Continued)

*Primary Examiner* — Thong Q Nguyen
(74) *Attorney, Agent, or Firm* — Hauptman Ham, LLP

(57) ABSTRACT

Describes herein are a microscope optical module, a microscope, a control device for the microscope optical module, and multiphoton excitation microscope, which can switch the observation field of view at high speed and observe a large field of view. The microscope optical module includes an optical-axis-shifting optical system having an optical element, an optical-axis-shifting optical system support for positioning the optical-axis-shifting optical system with respect to the objective light flux of the microscope, and a rotator arranged on the optical-axis-shifting optical system support, the rotator rotatably supporting the optical-axis-shifting optical system with respect to the optical axis of the
(Continued)

objective light flux, wherein the microscope optical module is added to an objective light flux side of a microscope.

17 Claims, 17 Drawing Sheets

(51) Int. Cl.
  *G02B 21/18* (2006.01)
  *G02B 21/36* (2006.01)
  *G02B 21/16* (2006.01)
  *G02B 3/00* (2006.01)

(58) Field of Classification Search
  CPC .. G02B 21/248; G02B 21/362; G02B 21/365; G02B 21/367
  USPC ................ 359/368–369, 372–373, 381–382, 359/368–389
  See application file for complete search history.

(56) References Cited

U.S. PATENT DOCUMENTS

| | | | | |
|---|---|---|---|---|
| 5,253,106 A * | 10/1993 | Hazard | .................. | G02B 21/18 359/368 |
| 5,337,178 A * | 8/1994 | Kung | ..................... | G02B 21/26 250/442.11 |
| 7,248,282 B2 * | 7/2007 | Maddison | ............ | G02B 21/244 348/79 |
| 7,528,374 B2 * | 5/2009 | Smitt | ........................ | G01J 3/02 250/339.12 |
| 7,636,465 B2 * | 12/2009 | Dutta-Choudhury | ........................ G06K 9/00134 | 382/133 |
| 8,077,386 B2 * | 12/2011 | Glaser | .................. | G02B 17/008 359/381 |
| 9,983,396 B2 * | 5/2018 | Tamano | ............... | G02B 21/361 |
| 2003/0002148 A1 * | 1/2003 | Engelhardt | .......... | G02B 21/006 359/368 |
| 2005/0248837 A1 | 11/2005 | Sase et al. | | |
| 2005/0270639 A1 | 12/2005 | Miki | | |
| 2007/0194214 A1 | 8/2007 | Pfeiffer | | |
| 2007/0205365 A1 | 9/2007 | Smitt et al. | | |
| 2010/0097692 A1 | 4/2010 | Glaser et al. | | |
| 2011/0189096 A1 * | 8/2011 | Watanabe | .............. | G01N 33/50 424/9.1 |
| 2012/0002274 A1 * | 1/2012 | Knoblich | ............... | G02B 21/24 359/380 |
| 2013/0094077 A1 | 4/2013 | Brueck et al. | | |
| 2018/0136445 A1 * | 5/2018 | Nakata | ................. | G02B 21/002 |

FOREIGN PATENT DOCUMENTS

| | | |
|---|---|---|
| CN | 1934481 A | 3/2007 |
| CN | 102253483 A | 11/2011 |
| CN | 202204985 U | 4/2012 |
| EP | 0055209 A2 | 6/1982 |
| JP | 57-102607 A | 6/1982 |
| JP | 2001-14621 A | 1/2001 |
| JP | 2002-90282 A | 3/2002 |
| JP | 2005-321657 A | 11/2005 |
| WO | 2013162079 A1 | 10/2013 |

OTHER PUBLICATIONS

The International Search Report for PCT/JP2016/072139 dated Nov. 1, 2016, citing the above references.
Chinese Office Action dated Mar. 13, 2020 for the corresponding Chinese patent application No. 201680051450.0, with partial English translation, citing the above reference(s).
Second Office Action issued for corresponding Chinese Patent Application No. 201680051450.0 dated Jan. 5, 2021, along with an English translation.

* cited by examiner

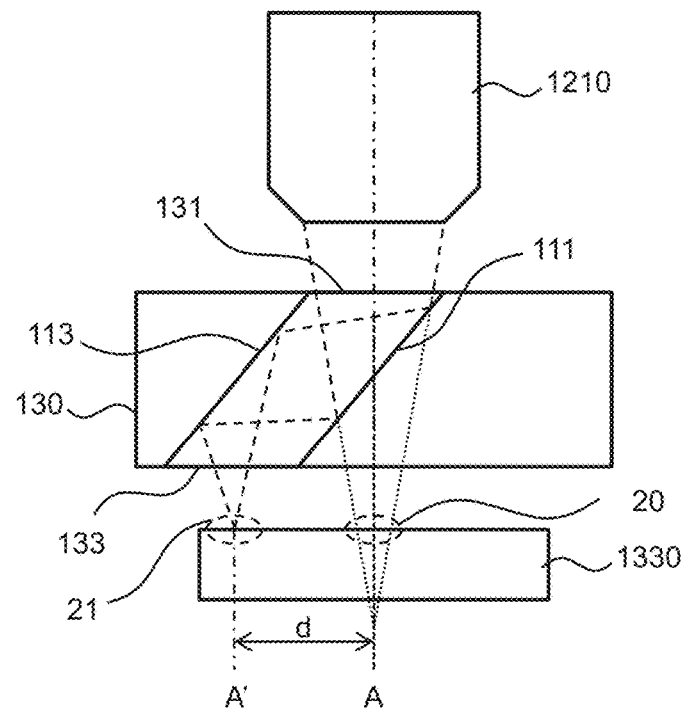
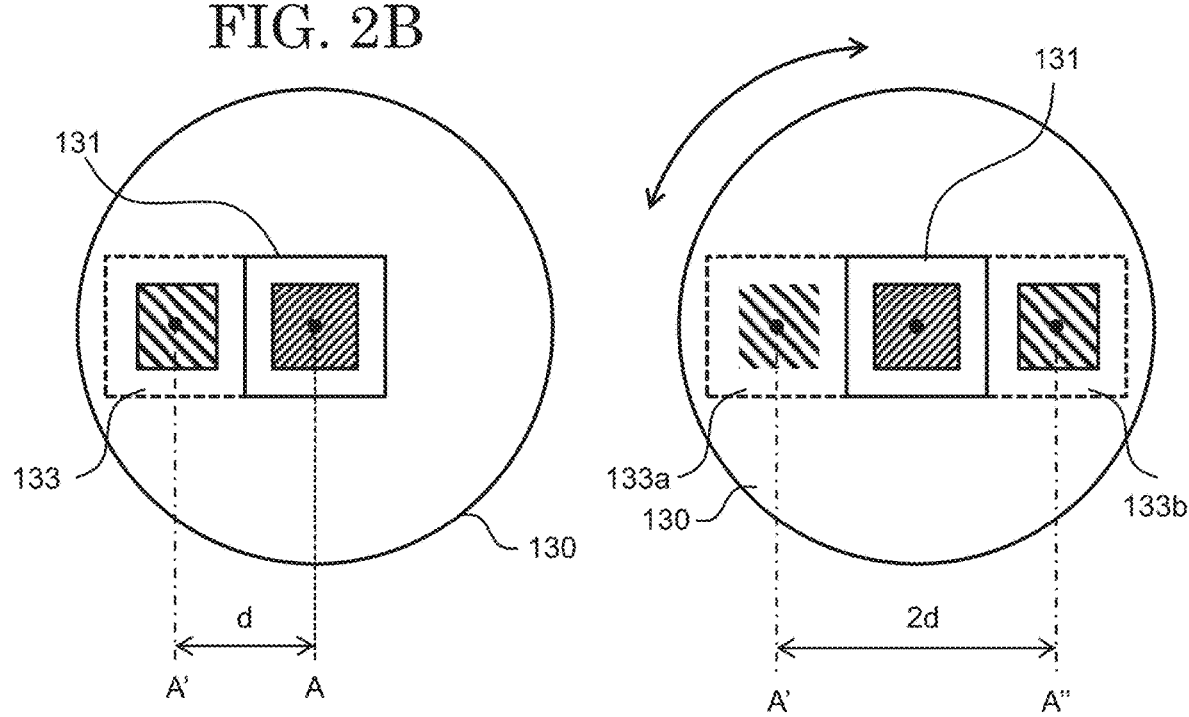

FIG. 9A
FIG. 9B
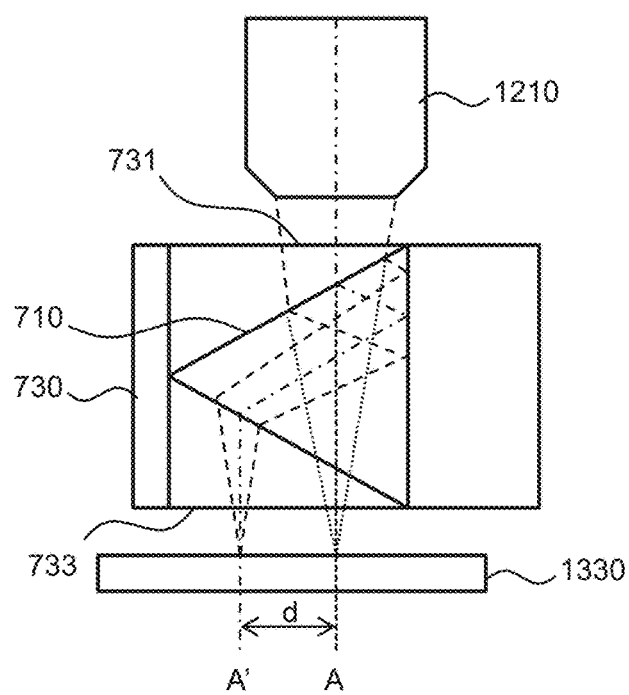
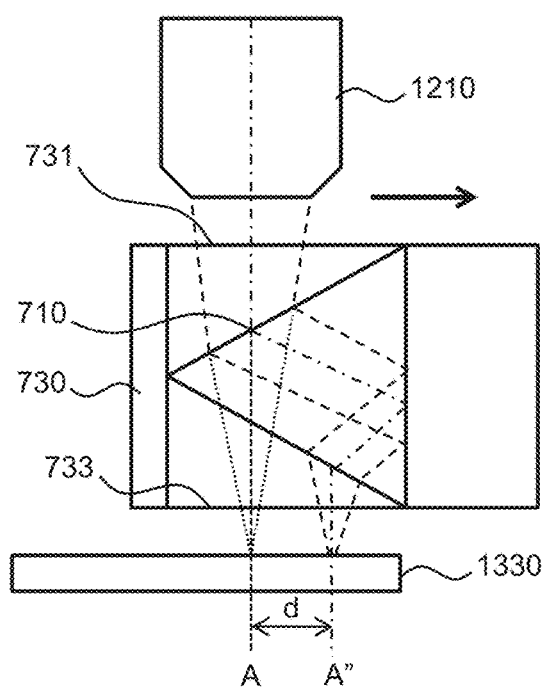

2 mm

200 µm 5.6 frames/s

FIG. 16A
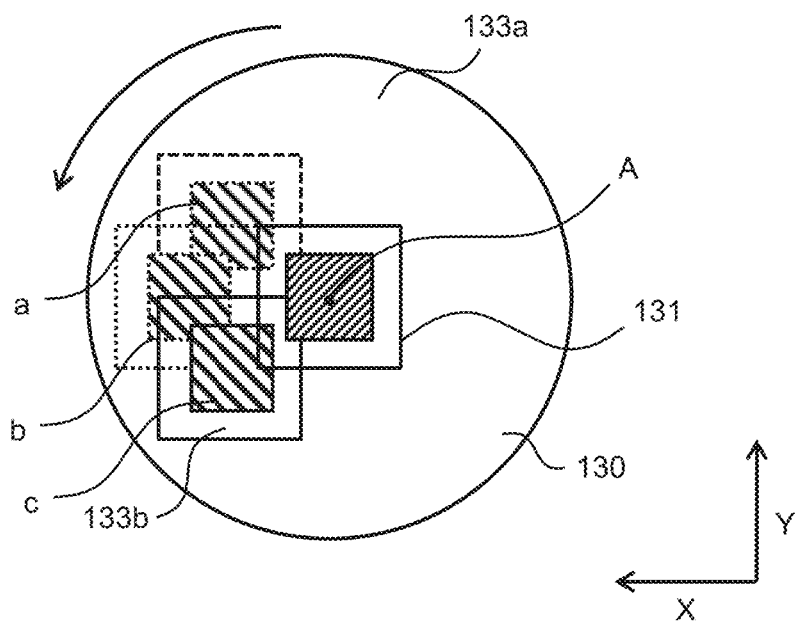
FIG. 16B
FIG. 16C
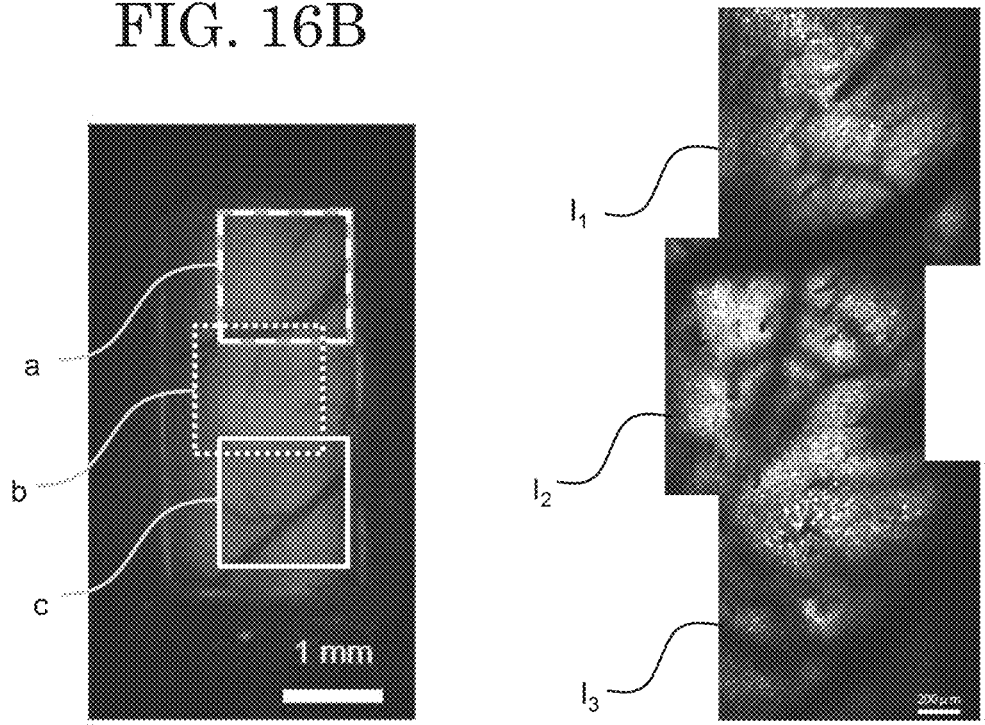

MICROSCOPE OPTICAL MODULE, MICROSCOPE, CONTROL DEVICE FOR MICROSCOPE OPTICAL MODULE, AND MULTIPHOTON EXCITATION MICROSCOPE

CROSS REFERENCE TO RELATED APPLICATIONS

This application is based upon and claims the benefit of priority from the prior Japanese Patent Application No. 2015-184497, filed on Sep. 17, 2015, and PCT Application No. PCT/JP2016/072139, filed on Jul. 28, 2016, the entire contents of which are incorporated herein by reference.

FIELD

The present invention is related to a microscope optical module, a microscope, a control device for the microscope optical module, and multiphoton excitation microscope. In particular, the present invention is related to a microscope optical module, a microscope, a control device for the microscope optical module, and multiphoton excitation microscope, which can switch an observation field of view at high speed, and which can observe a large field of view.

BACKGROUND

There is a method for observation at low magnification or a method for synthesizing a plurality of images captured while scanning a specimen into one observation image in order to obtain a wide observation field in a microscope observation. However, since the observation field of view becomes narrower in an observation at high magnification, it is not easy to obtain a wide observation field of view. In addition, although a stage is generally moved in a horizontal direction in order to image while scanning, since it is difficult to move the stage at a high speed and good precision, observation over a wide range of momentarily occurring events or observation at two or more separated points has been difficult up to now.

To solve these problems, for example, Japanese Laid Open Patent Publication No. 2005-321657 describes microscope optical system including a first objective lens that locates at the most sample side in an optical path between a sample and an image to be observed, a second objective lens that forms an intermediate image conjugate with the sample together with the first objective lens; and a mirror that changes the direction of the optical path by reflection and locates in the optical path between the first objective lens and the second objective lens. The mirror can be tilted with changing the position of a reflecting surface of the mirror, as a method capable of moving an observation field of view of a microscope without changing the position or the state of a sample and a stage and without moving or changing of an objective lens.

However, the Japanese Laid Open Patent Publication No. 2005-321657 is an observation technique with a high magnification optical system while switching a viewing block by a reflecting rotating mirror in an observable field by an objective lens without changing the positional relationship between an objective lens and the specimen by arranging a variable magnification optical system having a low magnification optical system and a high magnification optical system between an eyepiece and a low magnification objective lens for observing a wide field of view. Therefore, in Japanese Laid Open Patent Publication No. 2005-321657, since the observable field of view is limited by the positioned objective lens relative to the specimen, it is impossible to obtain a larger observation field than that.

In addition, in Japanese Laid Open Patent Publication No. 2005-321657, since switching of field blocks in the X-axis direction and the Y-axis direction is performed by the reflecting rotating mirror, two rotation shafts are required and makes position control of the reflection rotating mirror difficult. Therefore, when in the case of performing a scanning type observation in which the observation field is consecutively moved, it is difficult to perform reproducibly repeated observations.

SUMMARY

The present invention has been made to solve the above problems by providing a microscope optical module, a microscope, a control device for the microscope optical module, and multiphoton excitation microscope, which can switch the observation field of view at high speed and observe a large field of view.

According to one embodiment of the present invention, a microscope optical module is provided including an optical-axis-shifting optical system having an optical element, an optical-axis-shifting optical system support means for positioning the optical-axis-shifting optical system with respect to the objective light flux of the microscope, and a rotating means arranged on the optical-axis-shifting optical system support means, the rotating means rotatably supporting the optical-axis-shifting optical system with respect to the optical axis of the objective light flux, wherein the microscope optical module is added to an objective light flux side of a microscope.

In the microscope optical module, the optical-axis-shifting optical system may include a first opening part, a second opening part and an optical element arranged in the first opening part and the second opening part.

In the microscope optical module, an optical fiber may be used as the optical element of the optical-axis-shifting optical system.

In the microscope optical module, the optical element may be a prism arranged with roughly parallel opposing reflecting surfaces or a hollow reflective element fixedly supporting roughly parallel opposing reflecting surfaces.

In the microscope optical module, the optical element may include a GRIN lens, and roughly parallel opposing reflecting surfaces arranged at both ends of the GRIN lens or a prism arranged at both ends of the GRIN lens.

In the microscope optical module, the optical element may be a triangular prism.

In the microscope optical module, the optical-axis-shifting optical system support means may be able to change an angle of incidence on the optical element on a plane along an optical axis of the objective light flux of the microscope.

In the microscope optical module, a liquid may be capable of being filled between roughly parallel opposing reflecting surfaces in the hollow reflective element.

In addition, the microscope optical module may further include a drive mechanism for rotating and stopping the rotating means in the optical-axis-shifting optical system support means.

In addition, according to one embodiment of the present invention, a microscope may include any one of the microscope optical module.

In addition, according to one embodiment of the present invention, a control device for the microscope optical module includes a control system connected to the microscope optical module, wherein the rotation initial position and rotation angle of the optical-axis-shifting optical system can be set.

In the control device for the microscope optical module, an imaging instruction signal output means may be further included for instructing the start of imaging to an imaging device arranged in the microscope.

In the control device for the microscope optical module, an imaging termination instruction signal output means may be further included for instructing the termination of imaging to an imaging device arranged in the microscope before starting the rotation drive of a drive mechanism of the microscope optical module.

In the control device for the microscope optical module, a rotation drive may be started in response to a transmission of a signal transmitted before starting the rotation drive of the drive mechanism of the microscope optical module.

In the control device for the microscope optical module, the rotation drive of the drive mechanism of the microscope optical module may be performed under angular speed and position control.

In addition, according to one embodiment of the present invention, a microscope optical module includes an optical-axis-shifting optical system arranged with a prism having a surface inclined with respect to an objective light flux of a microscope, an optical-axis-shifting optical system support means for positioning the optical-axis-shifting optical system with respect to the objective light flux of the microscope, and a moving means arranged on the optical-axis-shifting optical system support means, the moving means movably supporting the optical-axis-shifting optical system in a horizontal direction and vertical direction with respect to an optical axis of the objective light flux, wherein the microscope optical module is added to an objective light flux side of a microscope.

In addition, in the microscope optical module, the optical-axis-shifting optical system may include a first opening part and a second opening part, and a prism arranged between the first opening part and the second opening part.

In addition, according to one embodiment of the present invention, a microscope includes any one of the microscope optical module.

In addition, according to one embodiment of the present invention, a control device for the microscope optical module includes a control system connected to the microscope optical module arranged in the microscope, wherein an initial position of the movement of the optical-axis-shifting optical system and the position in a horizontal direction and vertical direction with respect to an optical axis of the objective light flux can be set.

In the control device for the microscope optical module, an imaging instruction signal output means may be further included for instructing the start of imaging to an imaging device arranged in the microscope.

In the control device for the microscope optical module, an imaging termination instruction signal output means may be further included for instructing the termination of imaging to an imaging device arranged in the microscope before starting the rotation drive of the drive mechanism of the microscope optical module.

In the control device for the microscope optical module, a drive may be started in response to a transmission of a signal transmitted before starting the drive of the drive mechanism of the microscope optical module.

In addition, according to one embodiment of the present invention, a multiphoton excitation microscope includes any one of the microscope optical module.

In the control device for the microscope optical module, the microscope may be a multiphoton excitation microscope.

BRIEF EXPLANATION OF THE DRAWINGS

FIG. 2A is a cross-sectional view of the optical-axis-shifting optical system 130 and the objective lens 1210, and the specimen 1330;

FIG. 2B is an upper surface view of the optical-axis-shifting optical system 130 seen from the side of a first opening 131;

FIG. 2C is an upper surface view of the optical-axis-shifting optical system 130 seen from the side of a first opening 131;

FIG. 9A is an enlarged schematic diagram of the vicinity of an optical-axis-shifting optical system 730 shifted by a distance d to the optical axis A' with respect to the objective light flux according to an embodiment of the present invention in FIG. 8;

FIG. 9B is an enlarged schematic diagram of the vicinity of an optical-axis-shifting optical system 730 switching to the second opening part 733 to an observation field of the optical axis A" from an observation field of the optical axis A' according to an embodiment of the present invention in FIG. 8;

FIG. 16A shows a schematic diagram showing a state of rotating the optical-axis-shifting optical system 130 according to an example of the present invention toward the observation fields a to c;

FIG. 16B shows the observation field a to c positions in the brain of a mouse;

FIG. 16C shows a wide field observation image synthesized from observation images $I_1$ to $I_3$.

DESCRIPTION OF EMBODIMENTS

Figure 1:
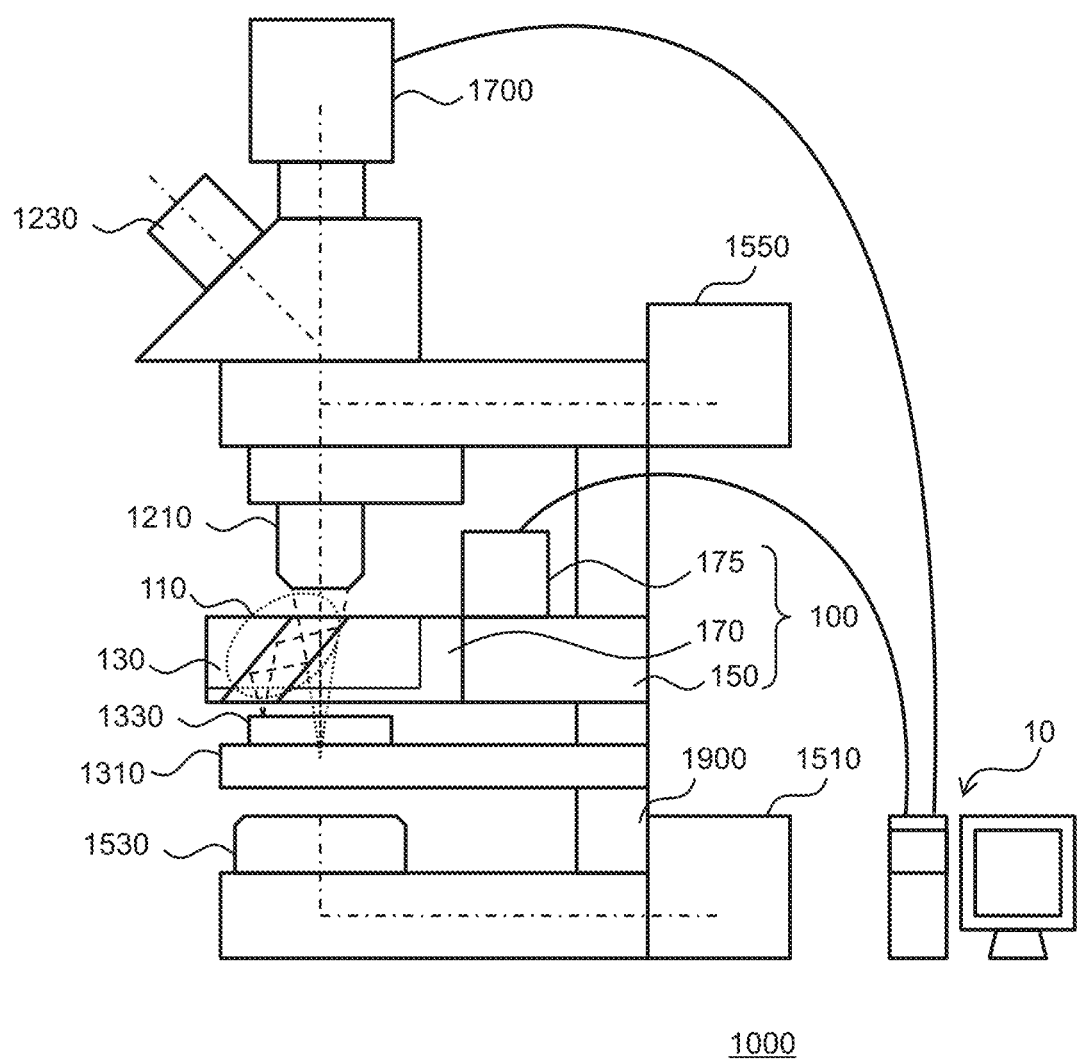
FIG. 1 is a schematic diagram showing a microscope 1000 arranged with a microscope optical module 100 according to an embodiment of the present invention.

A microscope optical module, a microscope, a control device for the microscope optical module and multiphoton excitation microscope according to one embodiment of the present invention are explained below while referring to the drawings. Furthermore, the following embodiments and examples are examples of the microscope optical module, the microscope, the control device for the microscope optical module and the multiphoton excitation microscope of the present invention, and the microscope optical module, the microscope, the control device for the microscope optical module and the multiphoton excitation microscope of the present invention are not limited to the following embodiments and examples.

A microscope optical module according to the present invention is arranged between a microscope objective lens and a stage, and an optical axis is shifted with respect to an objective light flux. The microscope optical module according to the present invention is arranged on the objective lens side and has an optical axis shift optical system including an optical element. The optical element in the present invention has a function for shifting an optical axis with respect to the objective light flux. Although specifically described below since there are a number of forms to the optical element, the microscope optical module according to the present invention is not limited to the following embodiments.

Embodiment 1

FIG. 1 is a schematic diagram showing a microscope 1000 added with a microscope optical module 100 according to the first embodiment of the present invention. FIGS. 2A to 2B are schematic diagrams enlarging the vicinity of an optical-axis-shifting optical system 130 according to the first embodiment of the present invention shown in FIG. 1. Furthermore, FIG. 2A is a cross-sectional view of the optical-axis-shifting optical system 130 and the objective lens 1210, and the specimen 1330, and FIG. 2B and FIG. 2C are upper surface views of the optical-axis-shifting optical system 130 seen from the side of a first opening 131.

The microscope optical module 100 is arranged on the objective light flux side of the microscope 1000 and is arranged with an optical-axis-shifting optical system 130 including an optical element 110. In addition, the microscope optical module 100 includes an optical axis shift optical system support means 150 for positioning the optical-axis-shifting optical system 130 with respect to the objective light flux of the microscope 1000, and includes a rotating means 170 arranged on the optical-axis-shifting optical system support means 150 for rotatably supporting the optical-axis-shifting optical system 130 with respect to the optical axis of the objective light flux.

The optical-axis-shifting optical system 130 includes a first opening part 131 arranged on the objective light flux side of the microscope 1000, and a second opening part 133 arranged on the specimen 1330 side. The optical element 110 is arranged between the first opening part 131 and the second opening 133. In the present specification, opening parts are optical openings. It is not an essential constituent for the first opening part 131 and second opening part 133 to be physically opened. That is, as long as transmission of light used by the microscope 1000 is possible to the extent that it does not affect observation, then a light transmitting member may be arranged in the first opening part 131 and/or the second opening part 133.

In the present embodiment, the optical element 110 includes with substantially parallel opposing reflecting surfaces 111 and 113. The optical element 110 is, for example, a prism having substantially parallel opposing reflecting surfaces or a hollow reflective element fixedly supporting substantially parallel opposing reflecting surfaces. In one embodiment, a liquid may be filled between the substantially parallel opposing reflecting surfaces of a hollow reflective element. By filling a liquid between the substantially parallel opposing reflecting surfaces of the hollow reflective element, observation by an immersion method is possible, and it is possible to suppress the influence of a refractive index due to air between the objective lens 1210 and the specimen 1330.

In FIG. 2A, when the microscope optical module 100 in FIG. 1 is not arranged, a vicinity of intersection 20 between the optical axis A of the objective light flux and the specimen 1330 becomes the observation field. On the other hand, by using the microscope optical module 100 according to the present invention, it is possible to shift by the distance d to the optical axis A' with respect to the objective light flux and it is possible to observe the vicinity of intersection 21 between the optical axis A' and the specimen 1330. That is, the objective light flux is repeatedly reflected between the opposing reflecting surfaces 111 and 113 and is shifted by the distance d between the first opening part 131 and second opening part 133.

By using the microscope optical module 100 according to the present embodiment, as is shown in FIG. 2B, it is possible to observe an observation field of the specimen 1330 located under the second opening part 133 which is shifted by a distance d via the objective lens 1210 from the first opening part 131. In addition, it is possible for the optical-axis-shifting optical system 130 to be rotated by a rotating means 170. By rotating the optical-axis-shifting optical system 130 by 180° by the rotating means 170 with respect to the second opening part 133a before rotation, it is possible to observe an observation field of the specimen 1330 located under the second opening part 133b. At this time, the distance between the second opening part 133a before rotation and the second opening 133b after rotating by 180° separate by 2d, and in the present embodiment, it is possible to successively observe two points separated by the distance 2d by rotating the optical-axis-shifting optical system 130 by the rotating means 170.

The rotating means 170 rotatably supports the optical-axis-shifting optical system 130 with respect to the optical axis of the objective light flux. In addition, the optical-axis-shifting optical system support means 150 includes a drive mechanism 175 for rotating and stopping the rotating means 170. A motor can be used for the drive mechanism 175. In addition, for example, a stepping motor is preferable as the rotating means 170 because accurate positioning control is possible. However, if the optical-axis-shifting optical system 130 can be rotated, and accurate positioning control is possible, other known means may be used as the rotating means 170. In the case where a stepping motor is used as the rotating means 170, for example, it is possible to switch the observation field from the first opening part 133a to the second opening part 133b in a few tens of milliseconds.

The optical-axis-shifting optical system support means 150 fixes the microscope optical module 100 to an arm 1900 of the microscope as well as setting the positioning of the first opening part 131 with respect to the objective light flux. For fixture to the arm 1900 by the optical-axis-shifting optical system support means 150, a known fixing means such as screws or clips can be used.

Control of the optical-axis-shifting optical system 130 by rotation drive can be performed by using a control device 10 for the microscope optical module. The control device 10 for the microscope optical module is a control system connected to the microscope optical module 100 arranged in the microscope 1000, and allows an initial position of rotation and rotation angle of the optical-axis-shifting optical system 130 to be set. The control device 10 for the microscope optical module is, for example, a computer including a control program for a microscope optical module. When setting the initial position and the rotation angle to the control device 10 for the microscope optical module, the control device 10 for the microscope optical module controls the drive mechanism 175, the second opening part 133 of the optical-axis-shifting optical system 130 is moved to an initial position by using the rotating means 170, then moved to the rotation angle set for second opening part 133. In this way, it is possible to sequentially observe two observation fields of view of the specimen 1330. Furthermore, it is also possible to sequentially observe a plurality of observation fields by setting a plurality of rotation angles. In addition, the control device 10 for the microscope optical module, may be set so that the second opening part 133 is returned to the initial position after moving to the rotation angle by which the second opening part 133 is set. Furthermore, the control device 10 for the microscope optical module may repeat movement of the second opening part 133 between an initial position and a set rotational angle by set number of times.

In addition, the rotation drive of the driving mechanism 175 of the microscope optical module 100 may be performed at an angle speed and position control. By setting an angular speed for moving the second opening part 133 and the position of the second opening part 133 to the control device 10 for the microscope optical module, it is possible to observe two or more observation fields of the specimen 1330 at a predetermined time interval. When setting the angular speed and the position of the second opening part 133, the control device 10 for the microscope optical module controls the drive mechanism 175, and the second opening part 133 of the optical-shaft shift optical system 130 is moved to a set position at a set angle speed using the rotating means 170. In this way, it is possible to observe the positional and temporal changes between two points by observing a second observation field after a lapse of a predetermined time after observing the first observation field. In addition, by rotatably driving the driving mechanism 175 at a high speed, it is possible to observe two or more observation field in millisecond units, and it is possible obtain an equal effect of almost simultaneously observing two or more observation fields for slower events.

In addition, in the case where the microscope 1000 includes an imaging device 1700, the control device 10 for the microscope optical module may include an imaging instruction signal output means for instructing an imaging device to start imaging. By the imaging instruction signal output means included in the control device 10 for the microscope optical module, it is possible to control the movement of the second opening part 133 of the optical-axis-shifting optical system 130, and the timing of imaging by the imaging device 1700. It is possible to successively image two or more observation fields at predetermined time intervals, and it is possible to continuously image events that have occurred in two or more observation fields. In addition, with regards to an event slower than the moving speed of the second opening part 133 of the optical-axis-shifting optical system 130, it is possible to obtain the effect equivalent to almost simultaneously capturing two or more observation fields.

The control device 10 for the microscope optical module may include an imaging end signal output means for instructing the imaging device arranged in the microscope 1000 to end imaging prior to rotation drive start of the drive mechanism 175 of the microscope optical module 100. By the control device 10 for the microscope optical module outputting an imaging end signal, the imaging device 1700 ends imaging and then the optical-axis-shifting optical system 130 is driven by drive rotation of the driving mechanism 175. In this way, unnecessary imaging is not performed during driving and it is possible to obtain only the necessary observation image. In addition, it is also possible to protect the imaging device 1700 from the impact of the rotation of the optical-axis-shifting optical system 130.

In addition, the control device 10 for the microscope optical module transmits a rotation drive start signal before the rotation drive start of the drive mechanism 175 of the microscope optical module 100. The drive mechanism 175 starts rotation driving in response to a rotation drive start signal. For example, after the control device 10 for the microscope optical module outputs an imaging end signal making the imaging device 1700 end imaging, it is possible to transmit a rotation drive start signal making the driving mechanism 175 start rotation driving.

Figure 3:
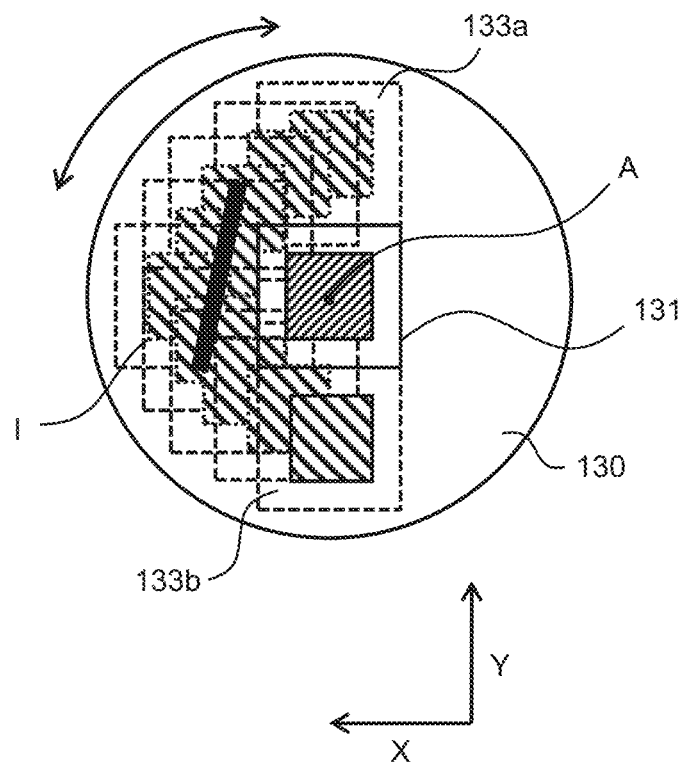
FIG. 3 is a schematic diagram for explaining a continuous imaging method according to an embodiment of the present invention.

By combining the initial position and rotation angle, the angular speed, the rotation drive start signal, the imaging instruction signal and the imaging end signal of the control device 10 for the microscope optical module described above, continuous imagining becomes possible as is shown in FIG. 3. FIG. 3 is a schematic diagram for explaining a continuous imaging method according to one embodiment of the present invention. In continuous imaging, the drive mechanism 175 moves the second opening part 133 to a first position, the imaging device 1700 images a first observation field for a predetermined time, the drive mechanism 175 moves the second opening part 133 to a second position, and the imaging device 1700 can carry out imaging of the second observation field for a predetermined time. More specifically, by an imaging instruction signal output from the imaging instruction signal output means, the drive mechanism 175 moves the second opening part 133 to the first position, the timing of imaging by the imaging device 1700 is controlled and the first observation field is imaged. In addition, by an imaging end signal output from the imaging end signal output means, the imaging device 1700 ends the imaging of the first observation field. Next, by an imaging instruction signal output from the imaging instruction signal output means, the drive mechanism 175 moves the second opening part 133 to the second position, the timing of imaging by the imaging device 1700 is controlled, and a second observation field is imaged. In addition, by an imaging end signal output from the imaging end signal output means, the imaging device 1700 ends imaging of the second observation field.

In the present embodiment, the microscope optical module 100 is controlled by the rotation drive having a center of rotation at the optical axis A of the objective light flux. For example, by rotating the second opening part of the optical-axis-shifting optical system 130 from the position 133a to the position 133b, and combining the observation images which are continuously imaged, it is possible to obtain an observation image obtained by scanning the two points of the specimen 1330. Here, when imaging by rotating the optical-axis-shifting optical system 130, together with the rotation of the optical-axis-shifting optical system 130, the observed image I is moved in parallel to the X-axis and Y-axis directions in a plane perpendicular to the optical axis A of the objective light flux. An image obtained by combining observation images is an image that has moved in parallel above a circumference with a center at the optical axis A. Although the obtained image locally becomes linearly, in the case of a large structure exists such as over a plurality of observation images as shown by X in FIG. 3, it is also possible to obtain such an overall picture.

By controlling the rotating means 170 such as a stepping motor by the control device 10 for the microscope optical module, high speed and high accuracy position control of the microscope optical module 100 having one shaft rotational axis is possible. Therefore, in the case of performing a scanning type observation when the observation field is consecutively moved, it is possible to perform repeated observations with good reproducibly. In addition, this is an excellent mechanism not available conventionally which can realize such a continuous observation at a high speed.

The microscope optical module according to the present invention can perform observation as described above by being arranged in an existing microscope. In addition, it is also possible to provide a microscope incorporating the microscope optical module according to the present invention. In one embodiment, the microscope 1000 includes an objective lens 1210, an eyepiece 1230, a stage 1310, a light source 1510, a window lens 1530 and an arm 1900. Light supplied from the light source 1510 is transmitted from the window lens 1530 through the specimen 1330 arranged on the stage 1310, is guided from the objective lens 1210 to the eyepiece 1230, and an observation image of a part of the specimen 1330 through which the light is transmitted is provided. Alternatively, the light source irradiates the specimen 1330 through an optical fiber independent of the microscope, the reflected light is guided from the objective lens 1210 to the eyepiece 1230, and an observation image of a part of the specimen 1330 may be provided. In the present embodiment, the microscope optical module 100 is fixed to the arm 1900 by the optical-axis-shifting optical system support means 150. As described above, the optical axis is shifted with respect to the objective light flux by arranging the microscope optical module 100 in the microscope 1000, and an observation field of view in a wide range not available up to now is available and it is possible to switch between two or more observation fields at high speed.

Further, it is possible to image the specimen 1330 by including the imaging device 1700. Furthermore, in the case where the microscope 1000 is a fluorescence microscope, light with a wavelength that excites fluorescence can be irradiated from a second light source 1550 via the objective lens 1210 onto the specimen 1330. In the present embodiment, the optical axis of the excitation light can be also shifted with respect to the objective light flux by the microscope optical module 100. In FIG. 1, although an upright microscope is exemplified, the present invention is not limited thereto, and arrangement in an inverted microscope is also possible.

In addition, in one embodiment, it is possible to provide a multiphoton excitation microscope arranged with a microscope optical module 100. A multiphoton excitation microscope is a microscope using a multiphoton excitation process and uses an excitation process of two or more photons. Therefore, in the present specification, a multiphoton excitation microscope may be a two-photon excitation microscope, a three-photon excitation microscope or a microscope which excites with even more photons. A multiphoton excitation microscope excites a deep part of a specimen 1330 and it is possible to observe its fluorescence. A multiphoton excitation microscope does not include an objective lens with low magnification and high numerical aperture and wide field observation was difficult. In addition, although the fluorescence of a deep part of a specimen can be observed which makes it suitable for use in bio-imaging, it was not possible to observe events occurring at separated tissues continuously or almost simultaneously. By arranging the microscope optical module 100 according to the present invention, it is possible to observe events occurring at separated tissues structures continuously or almost simultaneously using an existing multiphoton excitation microscope.

In addition, by combining the control device for the microscope optical module described above with a multiphoton excitation microscope arranged with the microscope optical module 100, two or more points separated events occurring in the deep part of an organism or tissue can be continuously or almost simultaneously imaged.

Figure 4A:
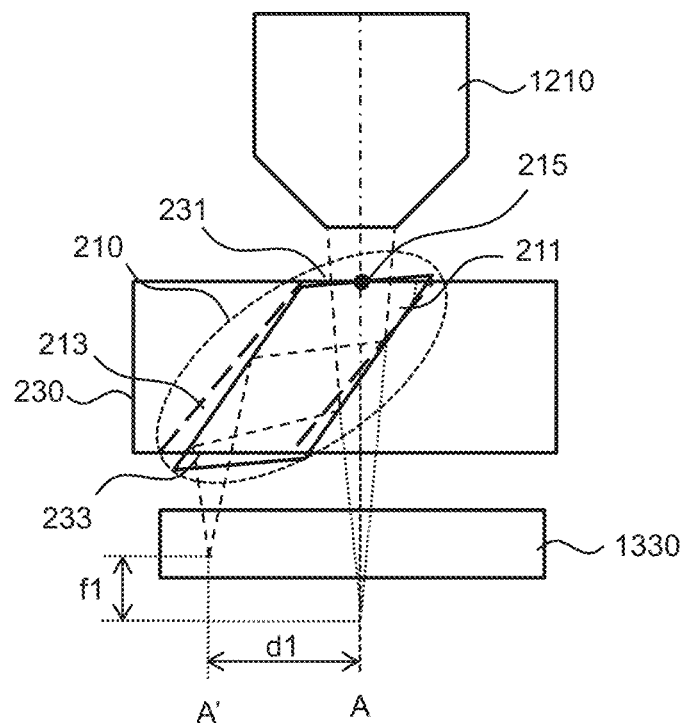
FIG. 4A is a schematic diagram of an optical element 210 according to an embodiment of the present invention the optical element 210 arranged on the optical axis shift optical system 230 is rotated around the rotation axis 215 above a plane along the microscope objective optical axis.
Figure 4B:
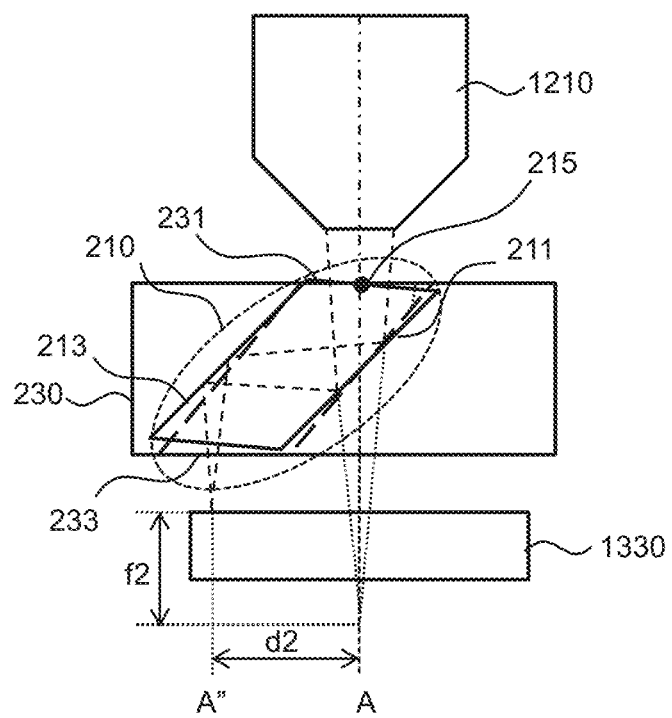
FIG. 4B is a schematic diagram of an optical element 210 according to an embodiment of the present invention when the optical element 210 arranged on the optical axis shift optical system 230 is rotated in the reverse direction around the rotation axis 215 above a plane along the microscope objective optical axis.

Here, a microscope optical module movable along the microscope objective optical axis is explained. FIGS. 4A and 4B are schematic diagram of an optical element 210 according to an embodiment of the present invention. By rotating the optical element 210, it is possible for the optical axis shift optical system 230 according to the present embodiment to change the angle of incidence with respect to the optical element 210 with respect to the microscope objective optical axis.

In FIG. 4A, when the optical element 210 arranged on the optical axis shift optical system 230 is rotated around the rotation axis 215 above a plane along the microscope objective optical axis, the angle of incidence with respect to the optical element 210 is changed, and it is possible to move the observation field by a distance d1 from the position A of the specimen 1330 to a position A' of the specimen 1330. At this time, with respect to the focal length at A of the specimen 1330, the focal length at the position A' of the specimen 1330 is shifted by a distance f1. In addition, in FIG. 4B, when the optical element 210 arranged on the optical axis shift optical system 230 is rotated in the reverse direction around the rotation axis 215 above a plane along the microscope objective optical axis, the angle of incidence with respect to the optical element 210 is changed, and it is possible to move the observation field by a distance d2 from the position A" of the specimen 1330 to a position A' of the specimen 1330.

With respect to the focal length at A of the specimen 1330, the focal length at the position A" of the specimen 1330 is shifted by a distance f2. The distance f2 shown in FIG. 4B is longer than the distance f1, that is, in the example shown in FIG. 4B, the focal length is shortened. Therefore, in the present embodiment, when the optical element 210 arranged on the optical axis shift optical system 230 is rotated around the rotation axis 215 above a plane along the microscope objective optical axis, the angle of incidence with respect to the optical element 210 is changed, and it is possible to change the focal length. For example, in the case where unevenness exists in an observation surface of the specimen 1330, it is possible to adjust the focal length by rotating the optical element 210 around the rotation axis 215.

Here, the rotatable range of the optical element 210 around the rotation axis 215 is from −7.07° to +7.07° with counter-clockwise as a positive direction in the case when light ray having a width of L/2 is incident to a prism having an incident surface with area L×L.

Since the optical-axis shift optical system 230 is a modified example of the optical-axis-shifting optical system 130 described above, it can be incorporated into the microscope optics module 100 in the microscope 1000 described above. Therefore, it encompasses all the actions and effects of using the microscope optical module 100 explained in the embodiments described above.

By controlling the rotation angle about the rotation axis 215, it is possible to observe the specimen 1330 by changing the angle of incidence to the optical element 210 with respect to the microscope objective optical axis, and by changing the distance of the observation field from the optical axis A. In the present embodiment, the optical axis shift optical system 230 is rotably drive by the rotating means 170 described above, and it is possible to sequentially observe two or more points on the circumference around the optical axis A by selecting an observation field from the optical axis A at a desired distance.

Figure 5A:
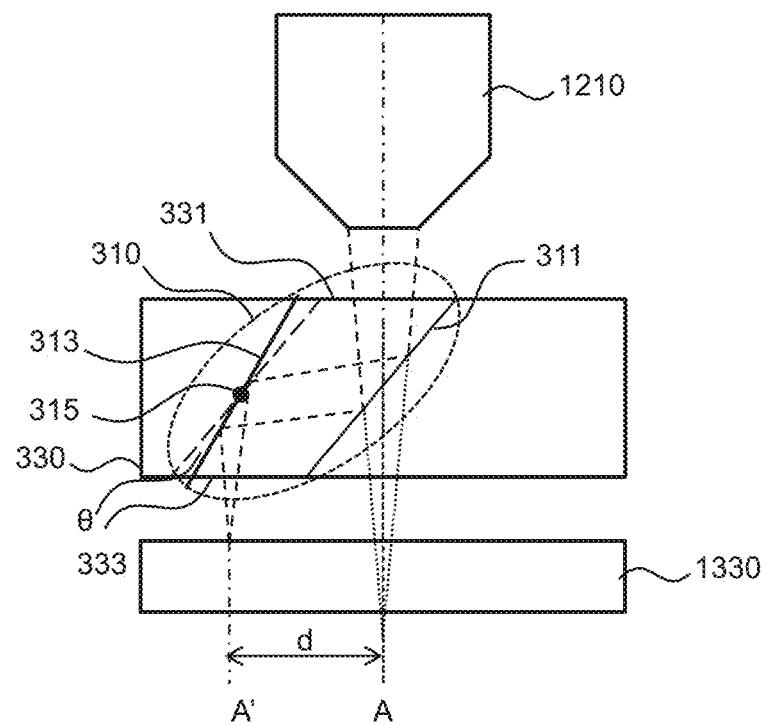
FIG. 5A is a schematic diagram of an optical element 310 according to an embodiment of the present invention when the second opposing reflecting surface 313 of the optical element 310 which is arranged on an optical axis shift optical system 330 is rotated around the rotation axis 315 above the plane along the microscope objective optical axis.
Figure 5B:
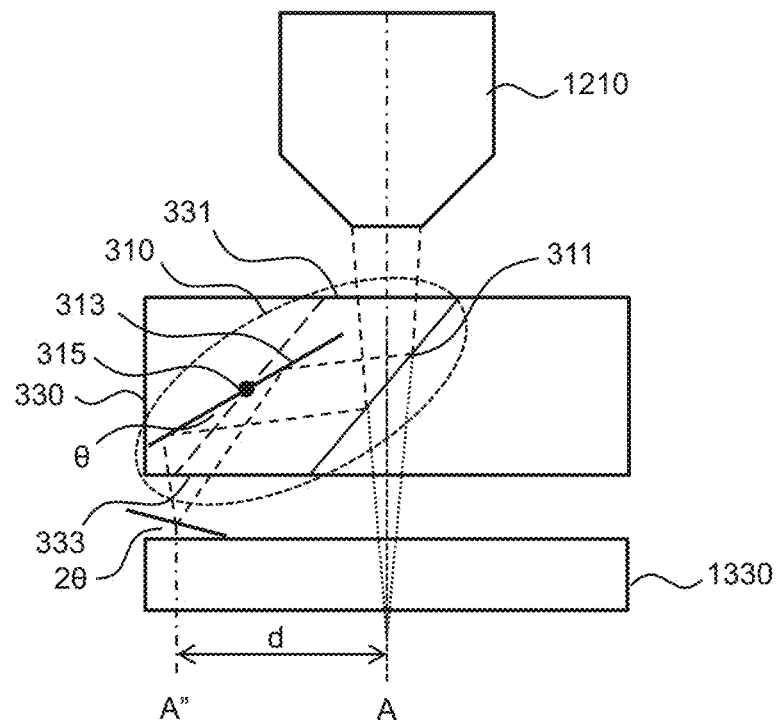
FIG. 5B is a schematic diagram of an optical element 310 according to an embodiment of the present invention when the second opposing reflecting surface 313 of the optical element 310 which is arranged on an optical axis shift optical system 330 is rotated around the rotation axis 315 above the plane along the microscope objective optical axis.

In FIGS. 4A and 4B, an example explained in which the angle of incidence on the optical element 210 is changed with respect to the microscope objective optical axis by rotating the optical element 210. In FIGS. 5A and 5B, examples of rotating only the second opposing reflecting surfaces 313 are explained.

In FIG. 5A, when the second opposing reflecting surface 313 of the optical element 310 which is arranged on an optical axis shift optical system 330 is rotated around the rotation axis 315 above the plane along the microscope objective optical axis, the incidence angle with respect to light reflected by a first opposing reflecting surface 311 is changed, and it is possible to move observation field by a distance d1 from the position of A of the specimen 1330 to the position of A' of the specimen 1330. In addition, in FIG. 5B, when the second opposing reflecting surface 313 is rotated in a reverse direction around the rotation axis 315 above the plane along the microscope objective optical axis, the incidence angle with respect to light reflected by a first opposing reflecting surface 311 is changed, and it is possible to move observation field by a distance d2 from the position of A of the specimen 1330 to the position of A" of the specimen 1330.

As is shown in FIG. 5B, in the present embodiment, the optical axis is inclined according to the inclination of the second opposing reflecting surface 313. As a result, observation is possible even in the case where the observation surface of the specimen 1330 is slanted with respect to the optical axis. At this time, in the case where the second opposing reflecting surface 313 is rotated by θ, an imaging area of the specimen 1330 will become tilted by 2θ.

Here, the rotatable range of the second opposing reflecting surface 313 about the rotation axis 315 is −24.29° to 12.15° with counter-clockwise as a positive direction in the case when light ray having a width of L/2 is incident to a prism having an incident surface width of L×L.

Since the optical-axis shift optical system 330 is a modified example of the optical-axis-shifting optical system 130 described above, it can be incorporated into the microscope optics module 100 in the microscope 1000 described above. Therefore, it encompasses all the actions and effects of using the microscope optical module 100 explained in the embodiments described above.

Figure 6A:
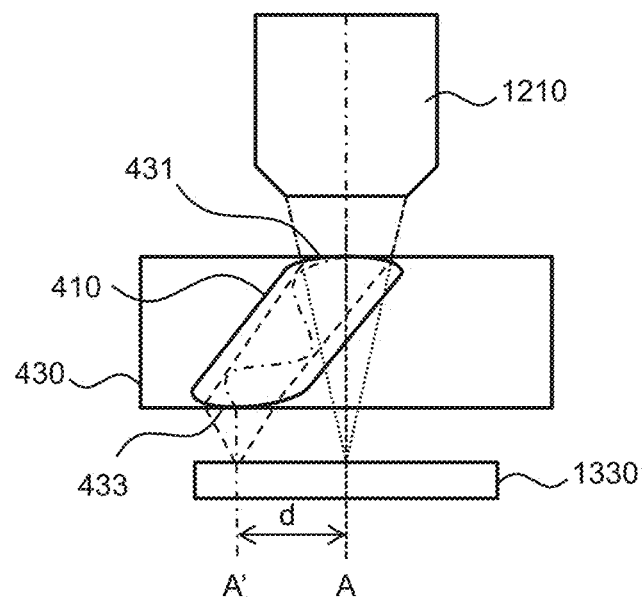
FIG. 6A is a schematic diagram showing a modified example using an optical fiber 410 as an optical element according to an embodiment of the present invention.

Next, another form of an optical element is explained as a modified example of the first embodiment. FIG. 6A shows an example using an optical fiber 410 as an optical element. The optical axis shift optical system 430 includes an optical fiber 410 arranged between a first opening part 431 and a second opening part 433. An objective light flux between the first opening part 431 and the second opening part 433 propagates inside the optical fiber 410 core, and shifts by a distance d from the optical axis A of the objective light flux in the case where a microscope optical module is not arranged to the optical axis A'. In FIG. 6A, although an example is shown in which optical fibers 410 are linearly arranged to the optical axis shift optical system 430, the present invention is not limited thereto. Since an optical fiber has flexibility, it can also be arranged in a curved shape in the optical axis shift optical system 430. Furthermore, since the optical axis shift optical system 430 is a modified example of the optical-axis-shifting optical system 130 described above, it can be incorporated in the microscope optical module 100 in the microscope 1000 described above. Therefore, it encompasses all the same actions and effects as the microscope optical module 100 explained in the embodiments described above.

Figure 6B:
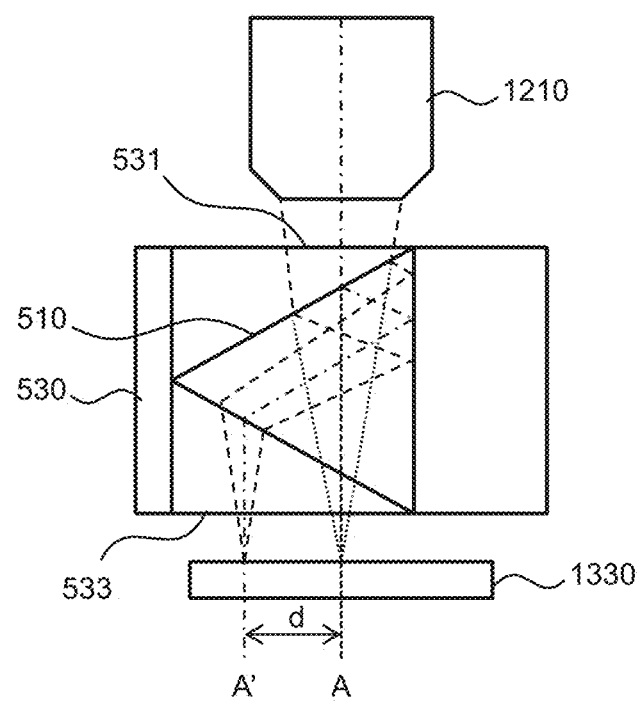
FIG. 6B is a schematic diagram showing a modified example using a triangular prism 510 as an optical element according to an embodiment of the present invention.

FIG. 6B shows an example using a triangular prism 510 as the optical element. The optical axis shift optical system 530 includes a triangular prism 510 arranged between a first opening part 531 and a second opening part 533. The objective light flux between the first opening part 531 and the second opening part 533 is repeatedly reflected inside the triangular prism 510, and shifts by a distance d from the optical axis A of the objective light flux in the case where a microscope optical module is not arranged to the optical axis A'. Furthermore, since the optical axis shift optical system 530 is a modified example of the optical-axis-shifting optical system 130 described above, it can be incorporated in the microscope optical module 100 in the microscope 1000 described above. Therefore, it encompasses all the same actions and effects as the microscope optical module 100 explained in the embodiments described above.

In addition, the optical axis shift optical system 530 is also a modified example of the optical axis shift optical system 130 of the microscope optical module 100 described above. By using the moving mechanism 151 of the optical axis shift optical system support means 150, the optical axis shift optical system 530 can change the incident angle with respect to the triangular prism 510 above a plane along the microscope objective optical axis. In this way, it is possible to observe the specimen 1330 by changing the distance of the observation field from the optical axis A. In the present embodiment, the optical axis shift optical system 530 is rotatably driven by the rotating means 170, an observation field at a desired distance from the optical axis A is selected, and it is possible to sequentially observe or two or more points on a circumference centered on the optical axis A.

Figure 7A:
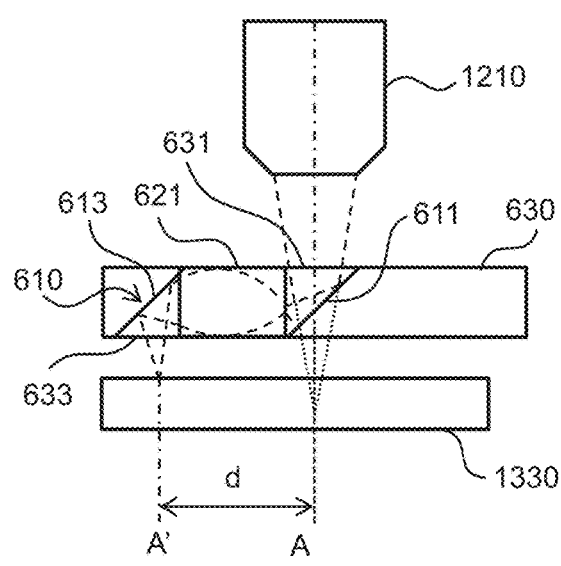
FIG. 7A is a schematic diagram of an optical-axis-shifting optical system 630 including an optical element 610 including a GRIN lens 621, and substantially parallel opposing reflecting surfaces 611 and 613 which are arranged at both ends of the GRIN lens 621 according to an embodiment of the present invention.
Figure 7B:
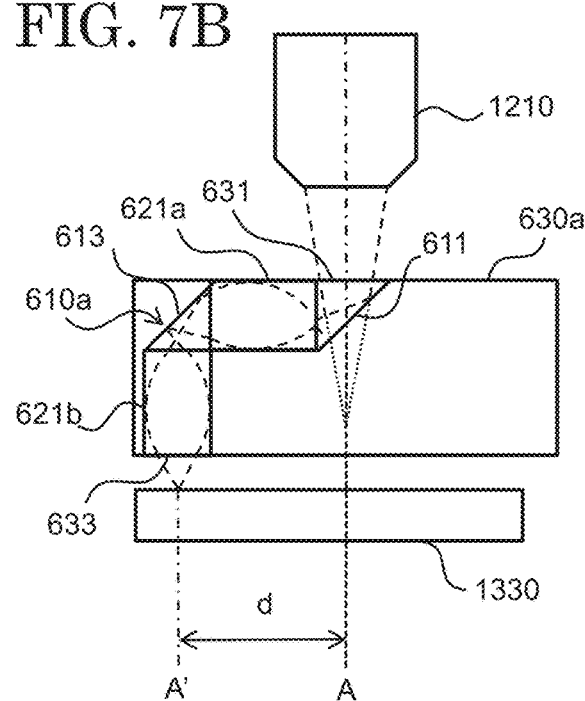
FIG. 7B is a schematic diagram of an optical-axis-shifting optical system 630a including an optical element 610a according to an embodiment of the present invention.
Figure 7C:
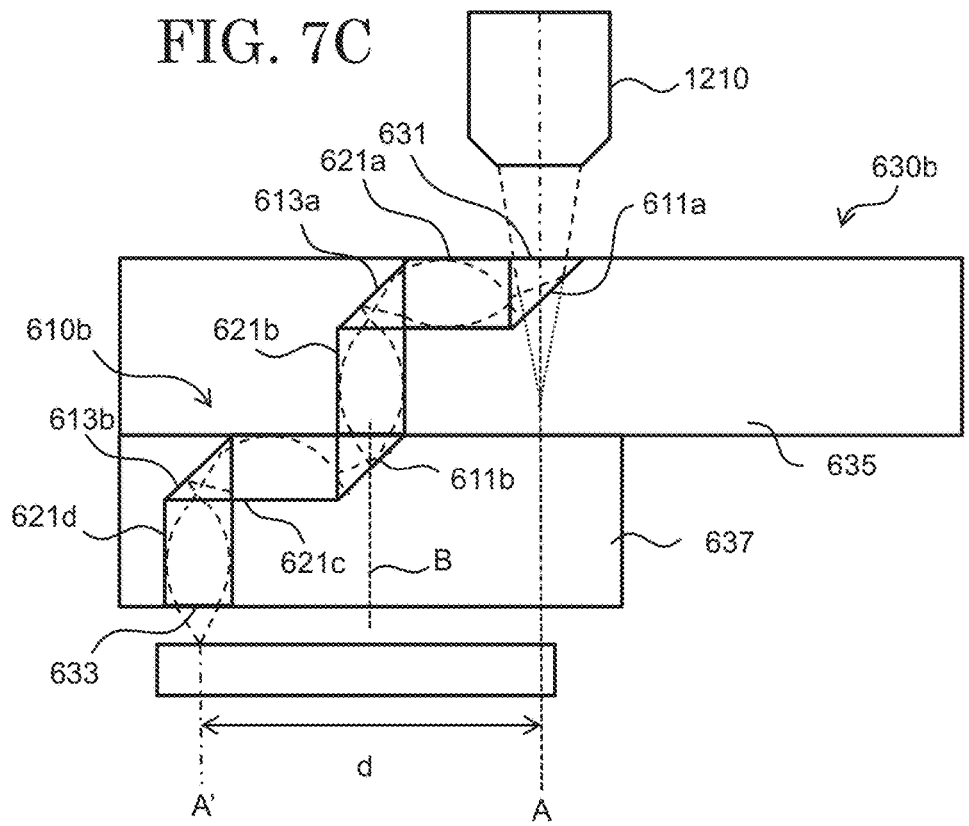
FIG. 7C is a schematic diagram of an optical-axis-shifting optical system 630b including an optical element 610b according to an embodiment of the present invention.

An optical element that combines the opposing reflecting surfaces and a GRIN lens explained in the optical element 110 is explained as a modified example of the optical element. FIGS. 7A to 7C are schematic diagrams of an optical-axis-shifting optical system 630 having an optical element 610. The optical element 610 includes a GRIN lens 621, and substantially parallel opposing reflecting surfaces 611 and 613 which are arranged at both ends of the GRIN lens 621. Furthermore, the substantially parallel opposing reflecting surfaces 611 and 613 which are arranged at both ends of the GRIN lens 621 may be replaced by a prism.

In FIG. 7A, the light incident from the specimen 1330 is reflected by the reflecting surface 613 and passes through the GRIN lens 621. The light which passed through the GRIN lens 621 is reflected by the reflecting surface 611 and enters the objective lens 1210. By this action, it is possible to be shifted by the distance d to the optical axis A' with respective to the objective light flux to observe a vicinity intersection between the optical axis A' and the specimen 1330.

Furthermore, in the optical element 610, it is possible to increase the distance d by combining a plurality of substantially parallel opposing reflecting surfaces or a prism with a GRIN lens. FIG. 7B is a schematic diagram of an optical-axis-shifting optical system 630a having an optical element 610a including two GRIN lenses 621a and 621b and substantially parallel opposing reflecting surfaces 611 and 613. The optical element 610a can shift the objective light flux along a microscope objective optical axis with respect to the optical element 610.

In addition, FIG. 7C is a schematic diagram of an optical-axis-shifting optical system 630b having an optical element 610b arranged with four GRIN lenses 621a to 621d, and two groups of substantially parallel opposing reflecting surfaces 611a and 613a, 611b and 613b. The optical element 610 includes a first optical axis shifting optical part 635 and a second optical axis shifting optical part 637 which can rotate independently. The first optical axis shifting optical part 635 includes the opposing reflecting surfaces 611a and 613a and two GRIN lenses 621a and 621b, which rotate around the optical axis A as the center of rotation. In addition, the second optical axis shifting optical part 637 includes the opposing reflecting surfaces 611b and 613b and two GRIN lenses 621c and 621d which rotate around the optical axis B as the center of rotation. Here, the optical axis B is an optical axis obtained when the optical axis A is shifted by the first optical axis shifting optical part 635.

In the optical-axis-shifting optical system 630b, the optical axis A is sequentially guided from the opposing reflecting surface 611a to the GRIN lens 621a, the opposing reflecting surface 613a and the GRIN lens 621b to shift the optical axis B. The optical axis B is sequentially guided from the opposing reflecting surface 611b to the GRIN lens 621c, the opposing reflecting surface 613b and the GRIN lens 621d to shift the optical axis A'. In the optical-axis-shifting optical system 630b, by providing two rotating mechanisms comprising a first optical axis shifting optic 635 and second optical axis shifting optical unit 637, it possible to shift the optical axis in two degrees of freedom in an XY plane.

In this way, in the optical element 610, by combining a plurality of substantially parallel opposing reflecting surfaces or prism with a GRIN lens, it is possible to arbitrarily change the distance d.

Furthermore, since the optical-axis-shifting optical system 630 is a modified example of the optical-axis-shifting optical system 130 described above, it can be incorporated into the microscope optical module 100 in the microscope 1000 described above. Therefore, it encompasses all the same actions and effects as the microscope optical module 100 explained in the embodiments describe above.

As explained above, the microscope optical module according to the present invention switches the observation field of view at high speed, and can observe a large field of view. In addition, by using the microscope optical module according to the present invention, it is possible to provide a microscope, a control device for the microscope optical module and a multiphoton excitation microscope which can switch the observation field of view at high speed, and observe large fields of view.

Embodiment 2

An aspect of switching an observation field by rotating drive of the optical axis shift optical system was explained described in embodiment 1. In the present embodiment, an aspect of switching the observation by using a prism and moving a prism in a horizontal direction with respect to the optical axis of the objective light flux is explained.

Figure 8:
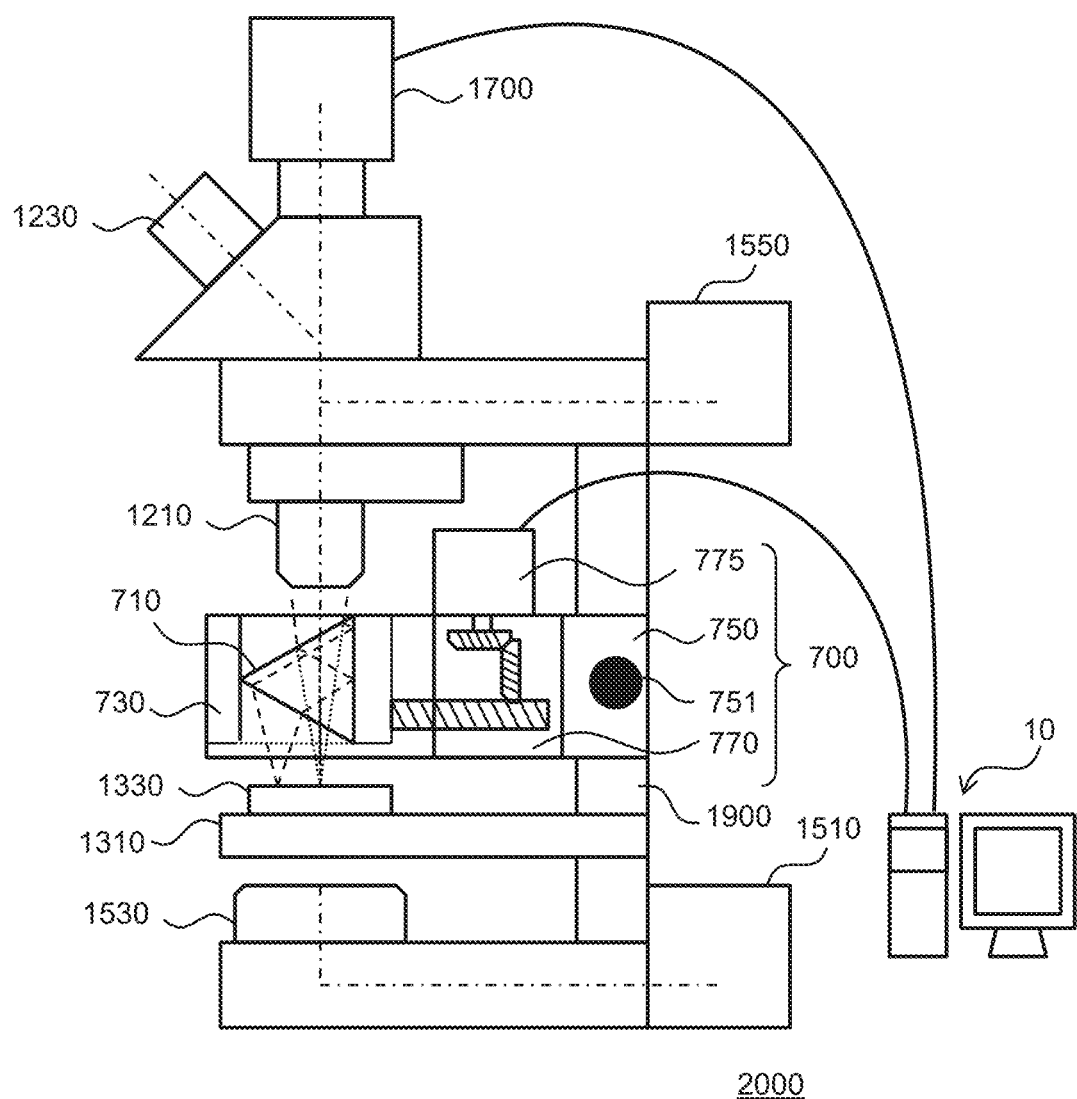
FIG. 8 is a schematic diagram showing a microscope 2000 arranged with a microscope optical module 700 according to an embodiment of the present invention.

FIG. 8 is a schematic diagram showing a microscope 2000 arranged with a microscope optical module 700 according to a second embodiment of the present invention. FIGS. 9A and 9B are enlarged schematic diagrams of the vicinity of an optical-axis-shifting optical system 730 according to the second embodiment of the present invention. The optical-axis-shifting optical system 730 includes a prism 710. The prism 710 has a surface inclined with respect to an objective light flux of the microscope. The Prism 710 is arranged between a first opening part 731 and a second opening part 733.

In addition, the microscope optical module 700 has an optical axis shift optical system support means 750 for positioning the first opening 731 with respect to the objective light flux of the microscope 1000, and a moving means 770 arranged on the optical-axis-shifting optical system support means 750 for movably supporting the optical-axis-shifting optical system 730 in a parallel direction and a perpendicular direction with respect to the optical axis of an objective light flux.

In FIG. 9A, when the microscope optical module 100 is not arranged, the vicinity intersection between the optical axis A of the objective light flux and the specimen 1330 becomes an observation field. On the other hand, by using the microscope optical module 700 according to the present invention, it is possible to be shifted by a distance d to the optical axis A' with respect to the objective light flux and it is possible to observe the vicinity intersection between the optical axis A' and the specimen 1330. That is, an objective light flux is repeatedly reflected inside the prism 710, and is shifted by a distance d between the first opening part 731 the second opening part 733.

The moving means 770 movably supports the optical-axis-shifting optical system 730 in a parallel direction and a perpendicular direction with respect to the optical axis of an objective light flux. In addition, the optical-axis-shifting optical system support means 750 includes a drive mechanism 775 for moving and stopping the moving means 770. A motor can be used for the drive mechanism 775. In addition, an electric cylinder is preferable as the moving means 770, for example, because accurate positioning control is possible. However, if the optical-axis-shifting optical system 730 is movable and accurate positioning control is possible, other known means may be used as the moving means 770. In the case of using an electric cylinder as the moving means 770, by advancing and retracting the optical-axis-shifting optical system 730 in a horizontal direction, it is possible to switch to the second opening part 733 to an observation field of the optical axis A" from an observation field of the optical axis A' as shown in FIG. 9B.

The optical-axis-shifting optical system support means 750 sets the position of the first opening part 731 with respect the objective light flux, and also fixes the microscope optical module 100 to the arm 1900 of the microscope 1000. The optical-axis-shifting optical system support means 750 includes a moving mechanism 751, and it is possible to move the optical-axis-shifting optical system 730 along the microscope objective optical axis. The moving mechanism 751 can use a known technology the same as a moving means in a direction along the objective optical axis of the stage 1310 including, for example, a height-adjustable knob. By using the moving mechanism 751, it is possible for the optical-axis-shifting optical system 730 to change the incident angle with respect to the prism 710 above a plane along the microscope objective optical axis.

Control of the optical-axis-shifting optical system 130 by the drive mechanism 775 and the moving mechanism 751 can be performed using the control device 10 for the microscope optical module. The control device 10 for the microscope optical module is a control system connected to the microscope optical module 700 arranged in the microscope 2000, and can set a position in a parallel direction and a perpendicular direction with respect to an optical axis of the objective light flux and the initial position of the movement of the optical-axis-shifting optical system 730. The control device 10 for a microscope optical module is, for example, a computer including a control program for a microscope optical module. When an initial position and the position of the parallel direction and the perpendicular direction with respect to the optical axis of the objective light flux are set in the control device 10 for the microscope optical module, the control device 10 for the microscope optical module controls the driving mechanism 775, to move the second opening part 733 of the optical-axis-shifting optical system 730 to the initial position by using the moving means 770, then moves the second opening part 733 to a set position in a parallel direction with respect to the optical axis of the objective light flux. In this way, it is possible to sequentially observe two observation fields of the specimen 1330. Furthermore, by setting a plurality of positions, it is also possible to sequentially observe the plurality of the observation fields. In addition, the control device 10 for the microscope optical module may be set so that the second opening 733 returns to the initial position after moving the second opening part 733 to the set position. Furthermore, the control device 10 for the microscope optical module may be configured so that movement of the second opening 733 is repeated by a set number of times at an initial position and a position in a parallel direction to the optical axis of the objective light flux.

In addition, in the case where the microscope 2000 includes an imaging device 1700, the control device 10 for the microscope optical module may include an imaging instruction signal output means for instructing the imaging device to start imaging. By including the imaging instruction signal output means in the control device 10 for the microscope optical module, it is possible to control the movement of the second opening part 733 of the optical-axis-shifting optical system 730, and control the timing of imaging by the imaging device 1700. It is possible to successively image two or more observation fields at predetermined time intervals, and it is possible to continuously image events that occurred in two or more observation fields. In addition, with respect to events slower than the moving speed of the second opening part 733 of the optical-axis-shifting optical system 730, it is possible to obtain the same effect of almost simultaneously imaging two or more observation fields.

The control device 10 for the microscope optical module may include an imaging end signal output means for instructing the imaging device arranged in the microscope 2000 to end imaging before the start of driving of the driving mechanism 775 of the microscope optical module 700. When the control device 10 for the microscope optical module outputs an imaging end signal, the imaging device 1700 stops imaging, then, the optical-axis-shifting optical system 730 is driven by the driving of the drive mechanism 775. In this way, unnecessary imaging is not performed when driving, and it is possible to obtain only a necessary observation image. In addition, it is possible to protect the imaging device 1700 from the impact of the movement of the optical-axis-shifting optical system 730.

In addition, the control device 10 for the microscope optical module transmits a drive start signal before starting the rotation drive of the drive mechanism 775 of the microscope optical module 700. The drive mechanism 775 starts driving in response to the drive start signal. For example, after the control device 10 for the microscope optical module outputs an imaging end signal making the imaging device 1700 end imaging, driving of the drive mechanism 775 can be started by transmitting a drive start signal.

By combining the initial position and a position in a direction parallel to the optical axis of the objective light flux, a rotation drive start signal, an imaging instruction signal and an imaging end signal by the control device 10 for the microscope optical module described above, continuous imaging becomes possible. By combining the observation image obtained by continuous imaging, it is possible to obtain an observation image obtained by scanning between two points of the specimen 1330.

The microscope optical module according to the present invention can perform the observation described above by being placed in an existing microscope. In addition, it is also possible to be provided as a microscope by incorporating the microscope optical module according to the present invention. In one embodiment, the microscope 2000 includes an objective lens 1210, an eyepiece 1230, a stage 1310, a light source 1510, a window lens 1530 and an arm 1900. Light supplied from the light source 1510 is transmitted from the window lens 1530 through the specimen 1330 arranged above the stage 1310, is guided from the objective lens 1210 to the eyepiece 1230, and an observation image of a part of the specimen 1330 through which the light is transmitted is provided. In present embodiment, the microscope optical module 700 is fixed to the arm 1900 by the optical-axis-shifting optical system support means 750. As described above, by arranging the microscope optical module 700 in the microscope 2000, the optical axis is shifted with respect to the objective light flux, a wide range of observation fields and fast observation field switching of two or more points unavailable until now becomes possible.

In addition, by including the imaging device 1700 it is also possible to image the specimen 1330. Furthermore, in the case where the microscope 2000 is a fluorescence microscope, it is possible to irradiate the specimen 1330 with light of a wavelength that excites fluorescence via the objective lens 1210 from a second light source 1550. In the present embodiment, the optical axis of the excitation light can also be shifted with respect to the objective light flux by the microscope optical module 700. Furthermore, in FIG. 8, although an upright microscope is shown, the present invention is not limited thereto, and it may be arranged in an inverted microscope.

In addition, in one embodiment, it is possible to provide a multiphoton excitation microscope arranged with a microscope optical module 700. A multiphoton excitation microscope excites light in a deep part of a specimen 1330 and it is possible to observe its fluorescence. A multiphoton excitation microscope does not include an objective lens with high numerical aperture and wide field observation was difficult. In addition, although the fluorescence of a deep part of a specimen can be observed which makes it suitable for use in bio-imaging, it was not possible to observe events occurring at separated tissues continuously or almost simultaneously. By arranging the microscope optical module 700 according to the present invention, it is possible to observe events occurring at separated tissues structures continuously or almost simultaneously using an existing multiphoton excitation microscope.

In addition, by combining the control device for the microscope optical module described above with a multiphoton excitation microscope arranged with the microscope optical module 700, two or more points separated events occurring in the deep part of an organism or tissue can be continuously imaged.

EXAMPLES

Figure 10A:
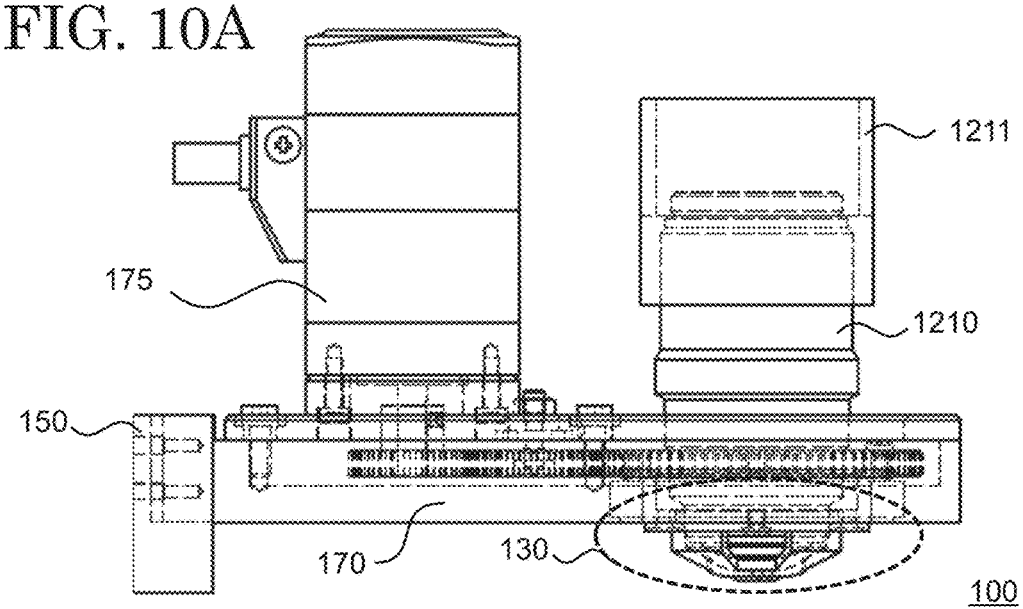
FIG. 10A is a schematic diagram of a microscope optical module 100 according to an example of the present invention.
Figure 10B:
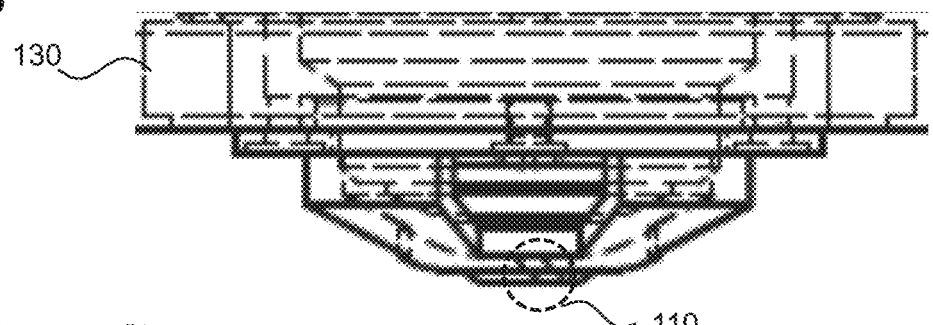
FIG. 10B is a schematic diagram of an optical-axis-shifting optical system 130 according to an example of the present invention.
Figure 10C:
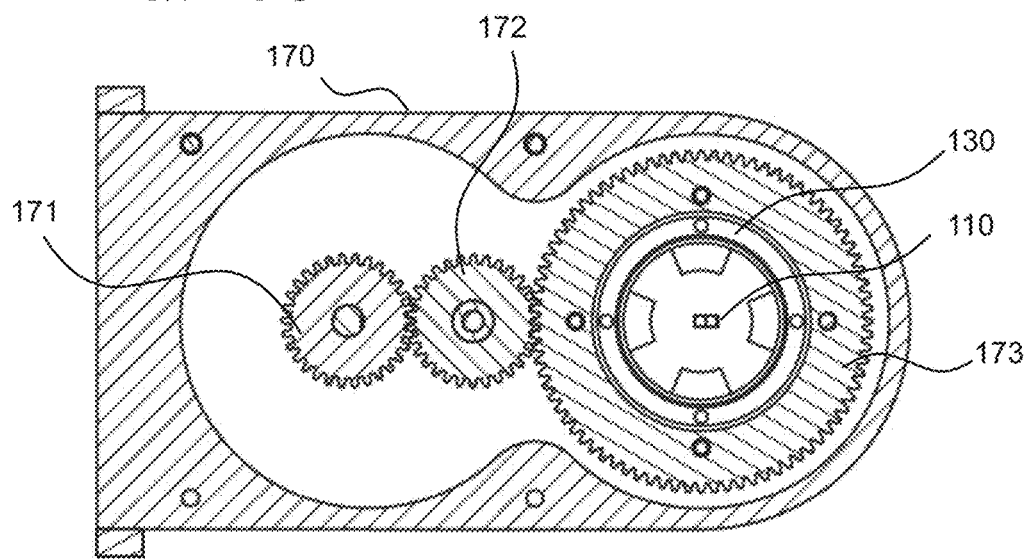
FIG. 10C is a schematic diagram of a rotating means 170 according to an example of the present invention.

A microscope optical module 100 of the first embodiment described above was fabricated and observation was carried out. FIGS. 10A to 10C are schematic diagrams of the microscope optical module 100 according to the present example. The microscope optical module 100 includes an optical-axis-shifting optical system 130, an optical axis shift optical system support means 150 and a rotating means 170. The rotating means 170 is a stepping motor including a motor as a drive mechanism 175. An objective lens 1210 is connected to a first opening part side of the optical-axis-shifting optical system 130. Rotational driving by the drive mechanism 175 is transmitted to the gear 173 connected to the optical-axis-shifting optical system 130 via a gear 172 from a gear 171 connected to the drive mechanism 175. Furthermore, the objective lens 1210 is connected to a piezoelectric element 1211 and is movable in the optical axis direction (Z axis direction).

In the present example, a hollow reflective element formed by fixedly supporting substantially parallel opposing reflecting surfaces is used as an optical element 110. The optical element 110 has a height of 2 mm, is arranged facing a reflecting surface with an incline of 45°, and an objective light flux is shifted 2 mm with respect to the optical axis of the objective light flux. The microscope optical module 100 of the present example achieved switching of a fast field of view in a time 43 ms which is required for rotating the optical-axis-shifting optical system 130 by 60° which was not possible in the conventional art.

The microscope optical module 100 according to the present example can be arranged in an optical microscope. For example, it can be arranged in an upright type optical microscope as is shown in FIG. 1. In addition, the microscope optical module 100 according to the present example can also be arranged in an inverted microscope. The microscope optical module 100 can be arranged regardless of whether it is an upright optical microscope or an inverted microscope as long as it is possible to support positioning of the optical-axis-shifting optical system 130 to the objective lens 1210. In addition, the microscope optical module 100 can also be arranged in a phase contrast microscope, a differential interference microscope, a polarized light microscope, a fluorescence microscope or a confocal laser microscope.

As an example, the microscope optical module 100 was arranged in a multiphoton excitation microscope (manufacturer: Olympus Corporation, model: FVMPE-RS) and the brain of a mouse was observed. In the present example, although two-photon excitation microscope was used as the multiphoton excitation microscope, it is also possible to use a microscope to excite three or more photons.

Figure 11A:
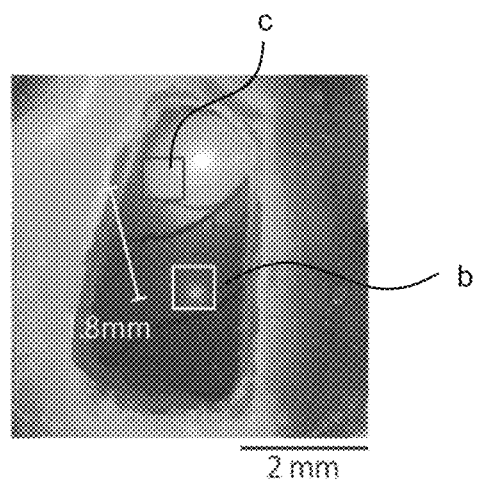
FIG. 11A shows a region of the brain of an observed mouse according to an example of the present invention.
Figure 11B:
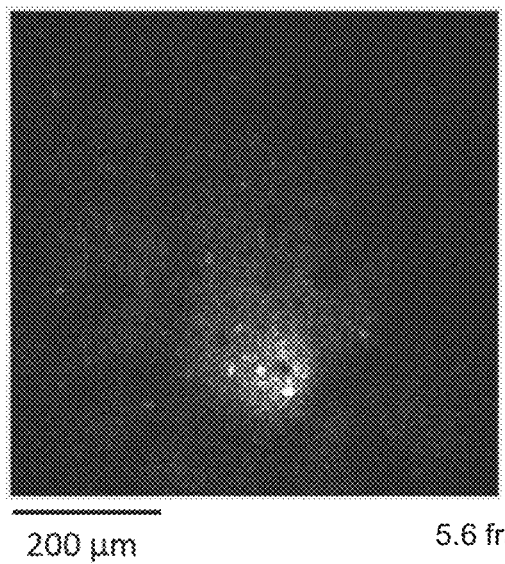
FIG. 11B shows an observation field b in FIG. 11A.
Figure 11C:
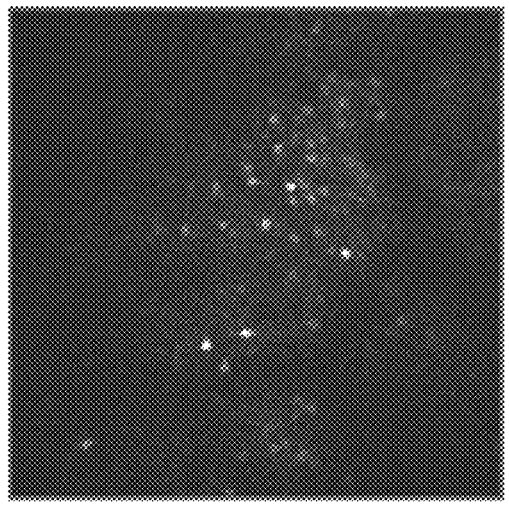
FIG. 11C shows an observation field c in FIG. 11A.
Figure 12:
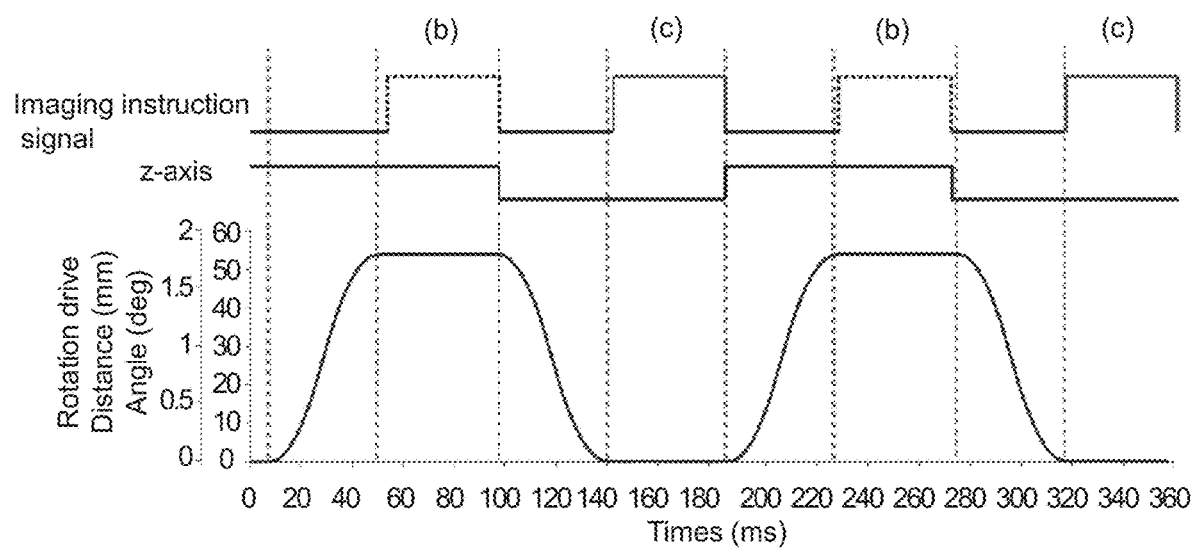
FIG. 12 shows a timing chart of drive control of the microscope optical module 100 according to an example of the present invention realizing high speed imaging of 5.6 frames/sec with respect to two observation fields.

FIG. 11A shows a region of the brain of the observed mouse. FIG. 11B shows an observation field b in FIG. 11A, and FIG. 11C shows an observation field c in FIG. 11A. In addition, FIG. 12 is a timing chart of driving control of the microscope optical module 100. In the present example, the piezoelectric element 1211 arranged with an optical system of a multiphoton excitation microscope was driven and imaging was performed by setting the focus in the Z-axis direction for each observation field.

In the timing chart of FIG. 12, the period (b) shows a period in which the observation field b in FIG. 11A was observed, and the period (c) shows a period in which the observation field c in FIG. 11A was observed. The optical-axis-shifting optical system 130 was rotated by the rotating means 170 and the second opening part was moved to the observation field b. An imaging instruction signal was output to the imaging device and an observation image of the observation field of view b was imaged. An imaging end signal was output to the imaging device, and the imaging in the observation field b was ended. The optical-axis-shifting optical system 130 was rotate by the rotating means 170, and the second opening was moved to the observation field c. At this time, the piezoelectric element 1211 was driven, the Z-axis of the objective lens 1210 was moved to the brain (lower) side of the mouse, and the observation field of view c was focused on. An imaging instruction signal was output to the imaging device, and an observation image of the observation field c was imaged. An imaging end signal was output to the imaging device, and imaging in the observation field c was ended. Next, the optical-axis-shifting optical system 130 was rotated by the rotating means 170, and the second opening was moved to the observation field b. At this time, the piezoelectric element 1211 was driven, and the Z-axis of the objective lens 1210 was moved to the original position (upward) and the observation field b was focused on. By repeating such control, the observation field b and the observation field c was imaged.

In the present example, with respect to two observation fields separated by 1.8 mm, it was shown that it is possible to realize high speed imaging of 5.6 frames/sec.

[Control of Imaging Depth]

The microscope optical module 100 was arranged in a multiphoton excitation microscope (manufacturer: Olympus Corporation, model: FVMPE-RS) and a region of two depths for each of the two field of view of the mouse brain were observed. In the present example, although a two-photon excitation microscope was used as a multiphoton excitation microscope, it is also possible to use a microscope to excite three or more photons.

Figure 13A:
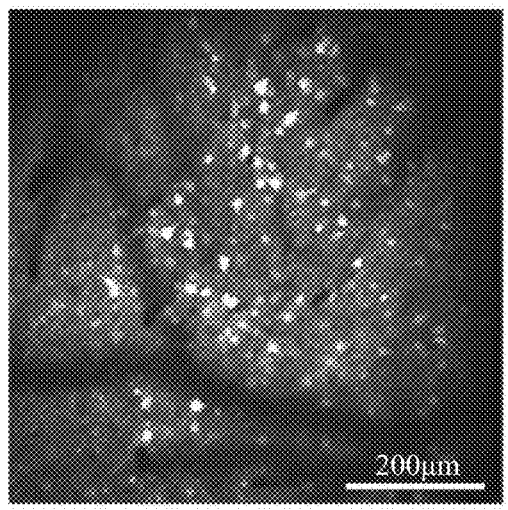
FIG. 13A shows observation field a of a brain of an observed mouse according to an example of the present invention.
Figure 13B:
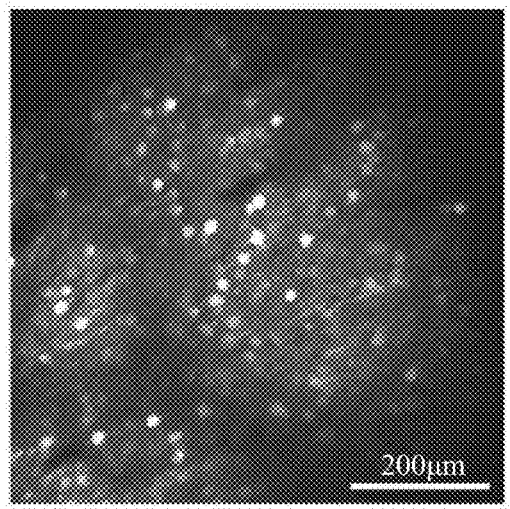
FIG. 13B shows observation field b of a brain of an observed mouse according to an example of the present invention.
Figure 13C:
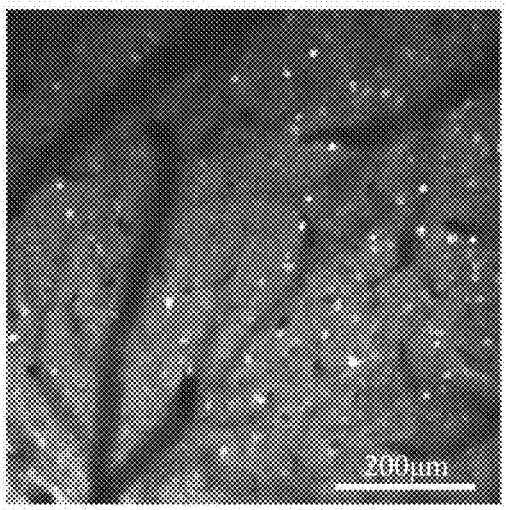
FIG. 13C shows observation field c of a brain of an observed mouse according to an example of the present invention.
Figure 13D:
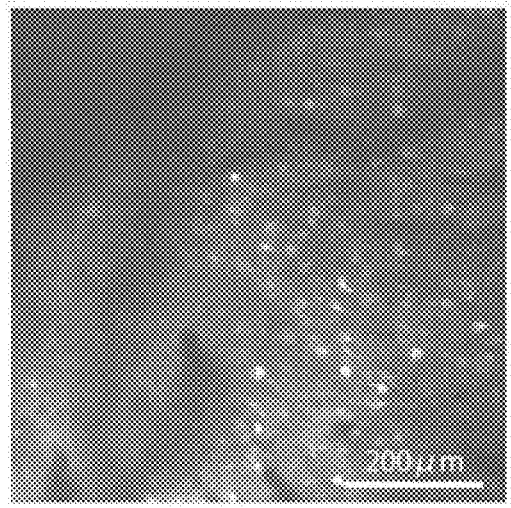
FIG. 13D shows observation field d of a brain of an observed mouse according to an example of the present invention.

FIGS. 13A to 13D respectively show the observation fields a to d of a mouse brain. The observation field a and observation field b shown in FIG. 13A and FIG. 13B show the observation field of different depths of a first region of the mouse brain, and observation field b is a region that is deeper than observation field a. In addition, the observation field c and observation field d shown in FIG. 13C and FIG. 13D show the observation field of different depths of a second region of the mouse brain, and observation field d is a region that is deeper than observation field c.

Figure 14:
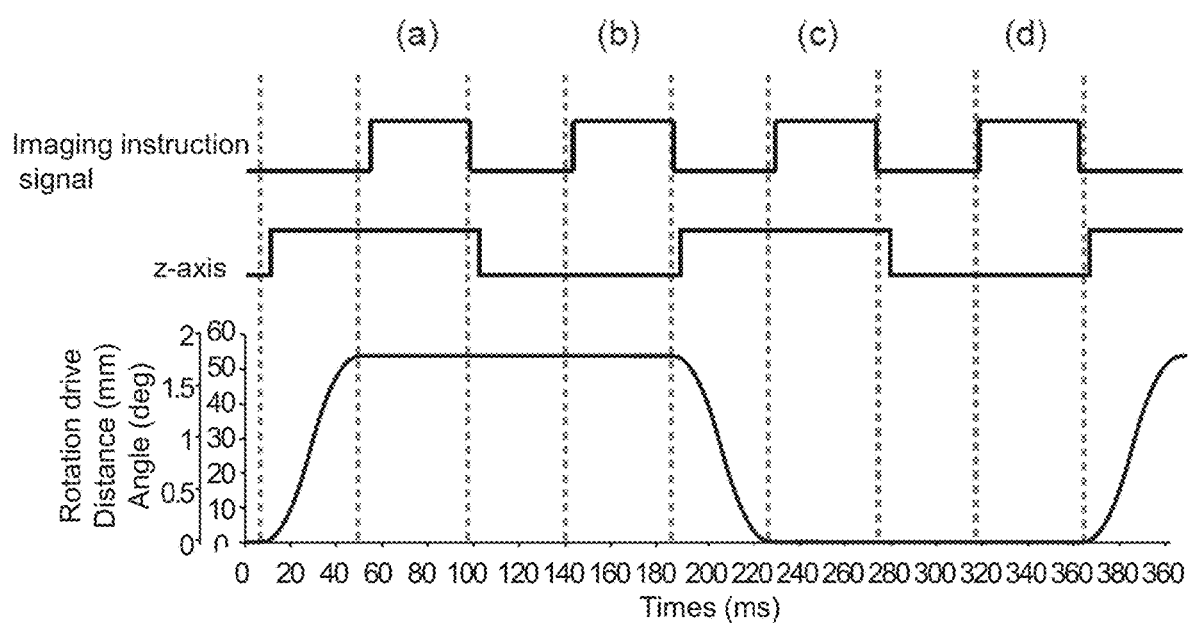
FIG. 14 shows a timing chart of drive control of the microscope optical module 100 according to an example of the present invention imaging a region with two depths with respect to two observation fields.

In addition, FIG. 14 shows a timing chart of driving control of the microscope optical module 100. In the present example, the piezoelectric element 1211 arranged with an optical system of a multiphoton excitation microscope was driven and imaging was performed by controlling the Z-axis direction of the depth for each observation field. In the timing chart of FIG. 14, the period (a) shows a period in which the observation field a in FIG. 13A was observed, the period (b) shows a period in which the observation field b in FIG. 13B was observed. In addition, the period (c) shows a period in which the observation field c in FIG. 13C was observed, and the period (d) shows a period in which the observation field d in FIG. 13D was observed.

The optical-axis-shifting optical system 130 was rotated by the rotating means 170 and the second opening part was moved to the observation field a. An imaging instruction signal was output to the imaging device, and an observation image of the observation field a was imaged. An imaging end signal was output to the imaging device, and imaging in the observation field a was ended. Following this, the piezoelectric element 1211 was driven, and the Z-axis of the objective lens 1210 was moved to the brain side (lower) of the mouse to focus on the observation field b which is a deep region. An imaging instruction signal was output to the imaging device, and an observation image of the observation field of view b was imaged. An imaging end signal was output to the imaging device, and imaging in the observation field b was ended.

Next, the optical-axis-shifting optical system 130 was rotated by the rotating means 170 and the second opening part was moved to the observation field c. At this time, the piezoelectric element 1211 was driven, and the Z-axis of the objective lens 1210 was moved to the original (upper) position. An imaging instruction signal was output to the imaging device, and an observation image of the observation field c was imaged. An imaging end signal was output to the imaging device, and imaging in the observation field c was ended. Following this, the piezoelectric element 1211 was driven, and the Z-axis of the objective lens 1210 was moved to the brain side (lower) of the mouse to focus on the observation field d which is a deep region. An imaging instruction signal was output to the imaging device, and an observation image of the observation field of d was imaged. An imaging end signal was output to the imaging device, and imaging in the observation field d was ended.

Next, the optical-axis-shifting optical system 130 was rotated by the rotating means 170, and the second opening was moved to the observation field a. At this time, the piezoelectric element 1211 was driven, and the Z-axis of the objective lens 1210 was moved to its original position (upward). The observation fields a to d were imaged by repeating such control.

In the present example, with respect to two observation fields separated by 1.8 mm, it was shown that a region with two depths can be imaged at high speed.

[Control of Imaging Magnification]

By arranging the microscope optical module 100 in the multiphoton excitation microscope, it is also possible to observe with a change in imaging magnification two views of the mouse brain. In addition, the multiphoton excitation microscope is not limited to a two-photon excitation microscope and it is also possible to use a microscope to excite three or more photons.

Figure 15:
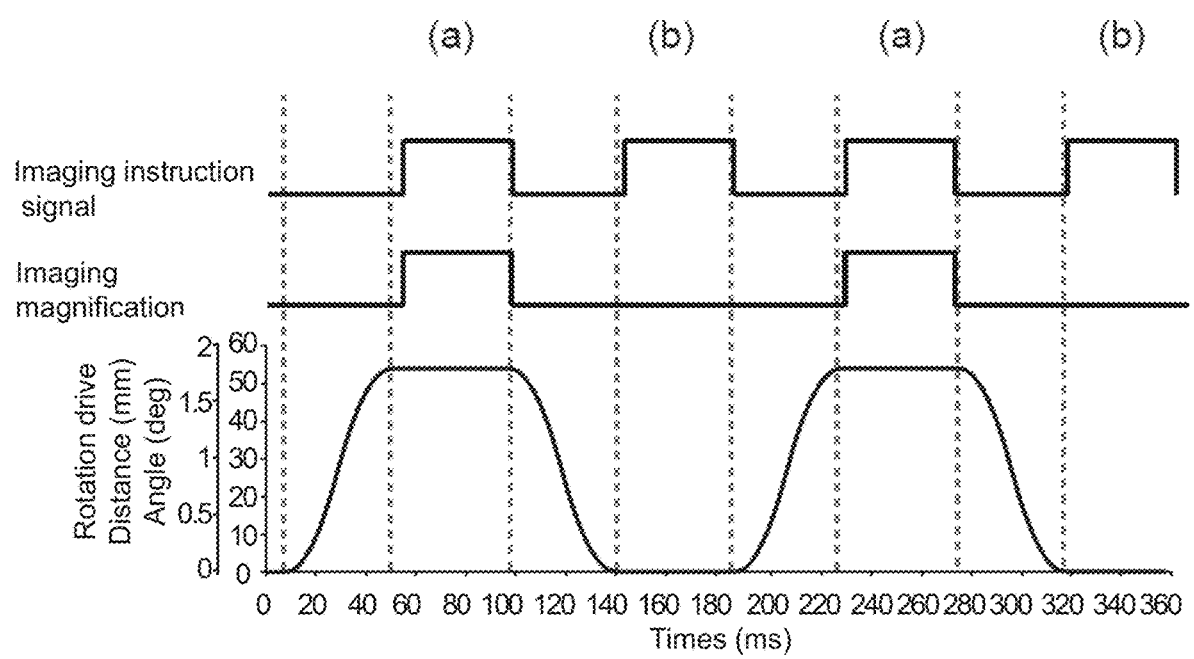
FIG. 15 shows a timing chart of drive control of the microscope optical module 100 according to an example of the present invention imaging two separated observation fields by changing the magnification for each observation field.

FIG. 15 shows a timing chart for driving and controlling the microscope optical module 100 as an example. Changing the imaging magnification, for example, can be performed using a digital zoom mechanism of a multiphoton excitation microscope, and it is possible to image by changing the magnification for each observation field.

In the control method of the specific imaging magnification, for example, the optical-axis-shifting optical system 130 was rotated by the rotating means 170 and the second opening was moved to the observation field a. An imaging instruction signal was output to the imaging device and an observation image of the observation field a was imaged. At this time, imaging can be performed at high magnification using a digital zoom mechanism of a multiphoton excitation microscope. An imaging end signal was output to the imaging device, and imaging in the observation field a was ended. Next, the optical-axis-shifting optical system 130 was rotated by the rotating means 170, and the second opening was moved to the observation field b. FIG. 15 shows an example of returning the magnification to its original imaging magnification using the digital zoom mechanism. An imaging instruction signal was output to the imaging device and an observation image of the observation field b was imaged. An imaging end signal was output to the imaging device, and imaging in the observation field b was ended.

Next, the optical-axis-shifting optical system 130 was rotated by the rotating means 170, and the second opening was moved to the observation field a. FIG. 15 shows an example of setting a high magnification using the digital zoom mechanism of a multiphoton excitation microscope. It is possible to image the observation fields a and b by repeating such control.

By adopting this method, two separated observation fields can be imaged at high speed by changing the magnification for each observation field.

[Wide Field Imaging]

The microscope optical module 100 was arranged in a multiphoton excitation microscope (manufacturer: Olympus Corporation, model: FVMPE-RS) and one wide field observation image was obtained by imaging three adjacent fields of the mouse brain. In the present example, although a two-photon excitation microscope was used as a multiphoton excitation microscope, it is also possible to use a microscope to excite three or more photons.

Figure 17:
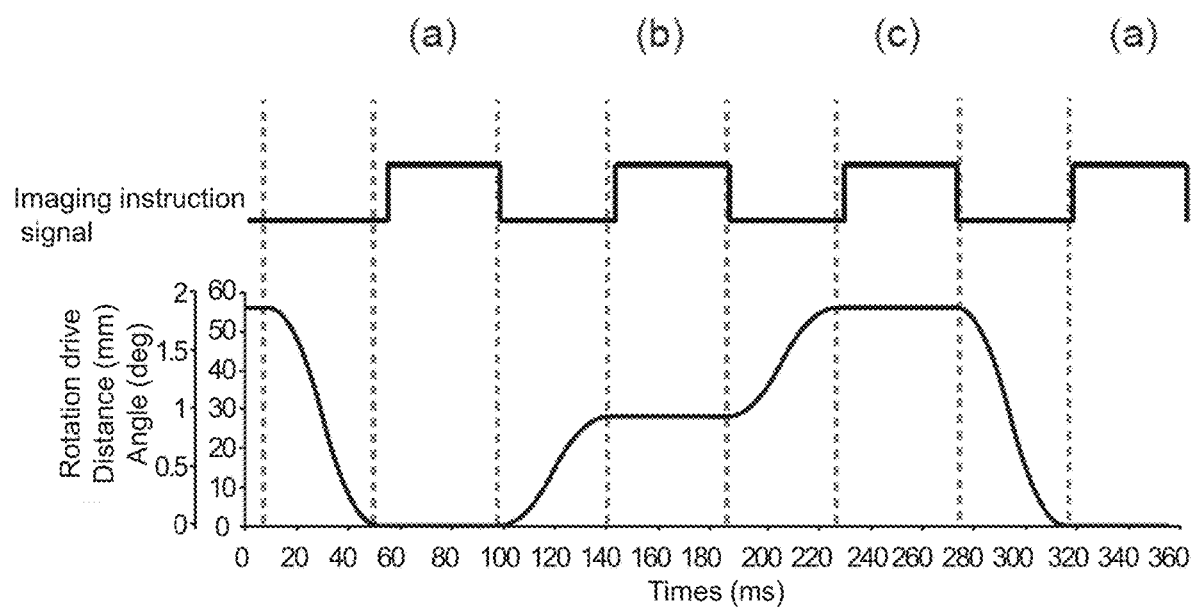
FIG. 17 shows a timing chart of drive control of the microscope optical module 100 according to an example of the present invention imaging observation fields a to c.

FIG. 16A is a schematic diagram showing a state of rotating the optical-axis-shifting optical system 130 to the observation fields a to c in order to obtain the observation images $I_1$ to $I_3$ of a mouse brain. FIG. 16B is a diagram showing the position of the observation fields a to c in a mouse brain. FIG. 16C is a diagram in which observation images $I_1$ to $I_3$, have been combined into one wide field observation image. In addition, FIG. 17 shows a timing chart of driving control of the microscope optical module 100.

The optical-axis-shifting optical system 130 was rotated by the rotating means 170 and the second opening was moved to the observation field a. An imaging instruction signal was output to the imaging device and observation image $I_1$ of the observation field a was imaged. An imaging end signal was output to the imaging device, and imaging in the observation field a was ended. Next, the optical-axis-shifting optical system 130 was rotated by the rotating means 170 and the second opening was moved to the observation field b. An imaging instruction signal was output to the imaging device and the observation image $I_2$ of the observation field b was imaged. An imaging end signal was output to the imaging device, and imaging in the observation field b was ended. Next, the optical-axis-shifting optical system 130 was rotated by the rotating means 170, and the second opening was moved to the observation field c. An imaging instruction signal was output to the imaging device, and the observation image $I_3$ of the observation field of view c was imaged. An imaging end signal was output to the imaging device, and imaging in the observation field c was ended. Observation fields a to c were imaged by repeating such control.

Observation images $I_1$ to $I_3$ were synthesized to obtain a single observation image with a wide field of view. In the present example, the microscope optical module 100 was controlled by rotational driving with the optical axis A of the objective light flux as the rotation center. By rotating the second opening part of the optical-axis-shifting optical system 130 to the observation fields a to c, and by combining the observation image obtained by continuous imaging, it was shown that it is possible to synthesize one observation image with a wide field of view.

According to the present invention, it is possible to provide a microscope optical module, a microscope, a control device for the microscope optical module, and multiphoton excitation microscope, which can switch the observation field of view at high speed and observe a large field of view.

In addition, as in the Patent Document 1, in a conventional microscope, it is necessary to purchase a new microscope for changing the optical system of the microscope itself. However, by using a microscope optical module and a control device for the microscope optical module according to the present invention, it is possible to switch the observation field of view at high speed using an existing microscope which allows observation of the large field of view.

What is claimed is:

1. A microscope comprising:
an objective lens having a first optical axis;
a microscope optical module between the objective lens and a specimen, wherein the specimen comprises an organism or tissue, and the microscope optical module comprises:
an optical-axis-shifting optical element configured to change an observation field of view of the specimen by shifting the first optical axis by a predetermined distance on the specimen to a second optical axis parallel to the first optical axis;
an optical-axis-shifting optical element support means configured to rotatably support the optical-axis-shifting optical element with respect to the first optical axis of the objective lens; and
a rotating means configured to rotate the optical-axis-shifting optical element with respect to the first optical axis of the objective lens according to a rotating controlling signal, with the optical-axis-shifting optical element being rotatably supported by the optical-axis-shifting optical element support means;
a light source for exciting multiphoton, the light source being configured to irradiate the specimen with light of a wavelength exciting fluorescence via the objective lens;
an imaging device configured to convert an optical image, through the object lens, to an image signal;
a control device configured to control the microscope optical module and output the rotating controlling signal to cause the imaging device to successively image two or more observation fields aligned with respect to the first optical axis as a rotation center, at predetermined time intervals; and
a digital zoom mechanism configured to change an imaging magnification for each observation field of the two or more observation fields according to a magnification controlling signal from the control device,
wherein
the rotating means is configured to intermittently rotate the optical-axis-shifting optical element according to the rotating controlling signal,
the imaging device is configured to image the two or more observation fields when rotation of the optical-axis-shifting optical element is stopped, to obtain two or more image signals at predetermined time intervals and predetermined spatial intervals,
the objective lens is movable in a first optical axis direction, and a position of the objective lens in the first optical axis direction is set for each of the observation fields,
the control device is configured to set the objective lens to a first position,
the rotating means is configured to rotate the optical-axis-shifting optical element to a first observation field according to the rotating controlling signal,
the imaging device is configured to image the first observation field when rotation of the optical-axis-shifting optical element is stopped,
the control device is configured to set the objective lens to a second position which is different from the first position,
the rotating means is configured to rotate the optical-axis-shifting optical element to a second observation field apart from the first observation field according to the rotating controlling signal, the imaging device is configured to image the second observation field when rotation of the optical-axis-shifting optical element is stopped, the digital zoom mechanism is configured to set the imaging magnification to a first magnification according to the magnification controlling signal based on the rotating means rotating the optical-axis-shifting optical element to the first observation field according to the rotating controlling signal, the digital zoom mechanism is configured to set the imaging magnification to a second magnification different from the first magnification according to the magnification controlling signal based on the rotating means rotating the optical-axis-shifting optical element to the second observation field apart from the first observation field according to the rotating controlling signal, and the imaging device is configured to continuously image sections of the organism or tissue at two or more separated points at different depths within the organism or tissue.

2. The microscope according to claim 1, wherein the optical-axis-shifting optical element is included in an optical-axis-shifting system that includes a first opening part arranged at a side of the objective lens, a second opening part arranged at a side of the specimen, and the optical-axis-shifting optical element is arranged between the first opening part and the second opening part.

3. The microscope according to claim 1, wherein the optical-axis-shifting optical element is an optical fiber.

4. The microscope according to claim 1, wherein the optical-axis-shifting optical element is a prism having roughly parallel opposing reflecting surfaces or a hollow reflective element having roughly parallel opposing reflecting surfaces.

5. The microscope according to claim 4, wherein the optical-axis-shifting optical element support means is configured to change an angle of incidence on the optical-axis-shifting optical element on a plane along the first optical axis of the objective lens of the microscope.

6. The microscope according to claim 4, wherein the hollow reflective element includes liquid filled between the parallel opposing reflecting surfaces.

7. The microscope according to claim 1, wherein the optical-axis-shifting optical element includes a GRIN lens and a prism arranged at both ends of the GRIN lens.

8. The microscope according to claim 1, wherein the optical-axis-shifting optical element is a triangular prism.

9. The microscope according to claim 1, wherein the control device is configured to output the rotating controlling signal in order to control angular speed and angular position of the rotating means.

10. The microscope according to claim 1, further comprising:

a piezoelectric element arranged between the objective lens and the imaging device, the piezoelectric element being configured to move the objective lens in the first optical axis direction, wherein the position of the objective lens in the first optical axis direction is set for each of the observation fields by the piezoelectric element.

11. A microscope comprising:

an objective lens having a first optical axis;

a microscope optical module between the objective lens and a specimen, wherein the specimen comprises an organism or tissue, and the microscope optical module comprises:

an optical-axis-shifting optical element having a surface inclined with respect to an objective lens of a microscope, the optical-axis-shifting optical element being configured to change an observation field of view of the specimen by shifting the first optical axis by a predetermined distance on the specimen to a second optical axis parallel to the first optical axis;

an optical-axis-shifting optical element support means configured to movably support the optical-axis-shifting optical element with respect to the first optical axis of the objective lens; and a moving means configured to move the optical-axis-shifting optical element with respect to the first optical axis of the objective lens according to a moving controlling signal, with the optical-axis-shifting optical element being movably supported by the optical-axis-shifting optical element support means;

a light source for exciting multiphoton, the light source being configured to irradiate the specimen with light of a wavelength exciting fluorescence via the objective lens;

an imaging device configured to convert an optical image, through the object lens, to an image signal;

a control device configured to control the microscope optical module and output the moving controlling signal to cause the imaging device to successively image two or more observation fields aligned with respect to the first optical axis at predetermined time intervals; and a digital zoom mechanism configured to change an imaging magnification for each observation field of the two or more observation fields according to a magnification controlling signal from the control device, wherein the moving means is configured to intermittently move the optical-axis-shifting optical element according to the moving controlling signal, the imaging device is configured to image the two or more observation fields when movement of the optical-axis-shifting optical element is stopped, to obtain two or more image signals at predetermined time intervals and predetermined spatial intervals, the objective lens is movable in a first optical axis direction, and a position of the objective lens in the first optical axis direction is set for each of the observation fields, the control device is configured to set the objective lens to a first position, the moving means is configured to move the optical-axis-shifting optical element to a first observation field according to the moving controlling signal, the imaging device is configured to image the first observation field when movement of the optical-axis-shifting optical element is stopped, the control device is configured to set the objective lens to a second position which is different from the first position, the moving means is configured to move the optical-axis-shifting optical element to a second observation field apart from the first observation field according to the moving controlling signal, the imaging device is configured to image the second observation field when movement of the optical-axis-shifting optical element is stopped, the digital zoom mechanism is configured to set the imaging magnification to a first magnification according to the magnification controlling signal based on the moving means moving the optical-axis-shifting optical element to the first observation field according to the moving controlling signal, the digital zoom mechanism is configured to set the imaging magnification to a second magnification different from the first magnification according to the magnification controlling signal based on the moving means moving the optical-axis-shifting optical element to the second observation field apart from the first observation field according to the moving controlling signal, and the imaging device is configured to continuously image sections of the organism or tissue at two or more separated points at different depths within the organism or tissue.

12. The microscope according to claim 11, further comprising: a first opening part arranged at a side of the objective lens, a second opening part arranged at a side of the specimen, and the optical-axis-shifting optical element is arranged between the first opening part and the second opening part.

13. The microscope according to claim 1, wherein the optical-axis-shifting element has a first optical opening part connected with the objective lens and a second optical opening part arranged at a side of the specimen, the optical-axis-shifting optical element is configured to change the observation field of view of the specimen by shifting the first optical axis by the predetermined distance on the specimen to the second optical axis which is parallel to the first optical axis and passes through the second optical opening part, and the rotating means is configured to cause the second optical opening part to be circulated around the first optical axis.

14. A microscope comprising:

an objective lens having a first optical axis;

a microscope optical module between the objective lens and a specimen, wherein the specimen comprises an organism or tissue, and the microscope optical module comprises:

an optical-axis-shifting optical element configured to change an observation field of view of the specimen by shifting the first optical axis by a predetermined distance on the specimen to a second optical axis parallel to the first optical axis;

an optical-axis-shifting optical element support means configured to rotatably support the optical-axis-shifting optical element with respect to the first optical axis of the objective lens; and a rotating means configured to rotate the optical-axis-shifting optical element with respect to the first optical axis of the objective lens according to a rotating controlling signal, with the optical-axis-shifting optical element being rotatably supported by the optical-axis-shifting optical element support means;

an imaging device configured to convert an optical image, through the object lens, to an image signal;

a control device configured to control the microscope optical module and output the rotating controlling signal to cause the imaging device to successively image two or more observation fields aligned with respect to the first optical axis as a rotation center, at predetermined time intervals;

a digital zoom mechanism configured to change an imaging magnification for each observation field of the two or more observation fields according to a magnification controlling signal from the control device; and a piezoelectric element arranged between the objective lens and the imaging device, the piezoelectric element being configured to move the objective lens in a first optical axis direction, wherein the rotating means is configured to intermittently rotate the optical-axis-shifting optical element according to the rotating controlling signal, the imaging device is configured to image the two or more observation fields when rotation of the optical-axis-shifting optical element is stopped, to obtain two or more image signals at predetermined time intervals and predetermined spatial intervals, the digital zoom mechanism is configured to set the imaging magnification to a first magnification according to the magnification controlling signal based on the rotating means rotating the optical-axis-shifting optical element to a first observation field of the two or more observation fields according to the rotating controlling signal, the digital zoom mechanism is configured to set the imaging magnification to a second magnification different from the first magnification according to the magnification controlling signal based on the rotating means rotating the optical-axis-shifting optical element to a second observation field of the two or more observation fields apart from the first observation field according to the rotating controlling signal, and the piezoelectric element is configured to set a position of the objective lens in the first optical axis direction is set for each of the observation fields.

15. The microscope according to claim 14, wherein the control device is configured to set the objective lens to a first position by driving the piezoelectric element, the rotating means is configured to rotate the optical-axis-shifting optical element to a first observation field according to the rotating controlling signal, the imaging device is configured to image the first observation field when rotation of the optical-axis-shifting optical element is stopped, the control device is configured to set the objective lens to a second position which is different from the first position by driving the piezoelectric element, the rotating means is configured to rotate the optical-axis-shifting optical element to a second observation field apart from the first observation field according to the rotating controlling signal, and the imaging device is configured to image the second observation field when rotation of the optical-axis-shifting optical element is stopped.

16. The microscope according to claim 15, wherein the imaging device is configured to continuously image sections of the organism or tissue at two or more separated points at different depths within the organism or tissue.

17. The microscope according to claim 14, wherein the microscope is a multiphoton excitation microscope.

* * * * *